(12) United States Patent
Izadian

(10) Patent No.: US 10,756,417 B2
(45) Date of Patent: Aug. 25, 2020

(54) ADAPTIVE POLARIMETRIC RADAR ARCHITECTURE FOR AUTONOMOUS DRIVING

(71) Applicant: Waymo LLC, Mountain View, CA (US)

(72) Inventor: Jamal Izadian, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 305 days.

(21) Appl. No.: 15/842,704

(22) Filed: Dec. 14, 2017

(65) Prior Publication Data
US 2019/0190133 A1 Jun. 20, 2019

(51) Int. Cl.
*H01Q 1/32* (2006.01)
*G01S 7/02* (2006.01)
(Continued)

(52) U.S. Cl.
CPC .......... *H01Q 1/3233* (2013.01); *G01S 7/024* (2013.01); *G01S 13/931* (2013.01); *H01Q 13/20* (2013.01); *H01Q 15/24* (2013.01)

(58) Field of Classification Search
CPC .............. H01Q 13/00; H01Q 13/0241; H01Q 13/0258; H01Q 15/24; H01Q 15/242; H01Q 15/246; H01P 1/165; H01P 1/17
See application file for complete search history.

(56) References Cited

U.S. PATENT DOCUMENTS

| | | | | |
|---|---|---|---|---|
| 2,628,278 A | * | 2/1953 | Zaleski | H01P 1/065 333/257 |
| 4,311,973 A | * | 1/1982 | Nuding | H01P 1/022 333/21 A |

(Continued)

OTHER PUBLICATIONS

Lagasse, Paul et al., "Square and Rectangular Waveguides with Rounded Corners," IEEE Transactions on Microwave Theory and Techniques, vol. MTT-20, No. 5, pp. 331-337, dated May 31, 1972.

(Continued)

*Primary Examiner* — Peter M Bythrow
(74) *Attorney, Agent, or Firm* — McDonnell Boehnen Hulbert & Berghoff LLP

(57) ABSTRACT

An antenna includes a plurality of waveguide antenna elements arranged in a first array configured to operate with a first polarization. The antenna also includes a plurality of waveguide output ports arranged in a second array configured to operate with a second polarization. The second polarization is different from the first polarization. The antenna further includes a polarization-modification layer with channels defined therein. The polarization-modification layer is disposed between the waveguide antenna elements and the waveguide output ports. The channels are oriented at a first angle with respect to the waveguide antenna elements and at a second angle with respect to the waveguide output ports. The channels are configured to receive input electromagnetic waves having the first polarization and transmit output electromagnetic waves having a first intermediate polarization. The waveguide output ports are configured to receive input electromagnetic waves and radiate electromagnetic waves having the second polarization.

20 Claims, 14 Drawing Sheets

(51) Int. Cl.
  *G01S 13/931* (2020.01)
  *H01Q 13/20* (2006.01)
  *H01Q 15/24* (2006.01)

(56) References Cited

U.S. PATENT DOCUMENTS

| | | | | |
|---|---|---|---|---|
| 5,364,136 | A * | 11/1994 | Forti | F16L 25/14 |
| | | | | 138/122 |
| 6,853,343 | B2 * | 2/2005 | McCandless | H01Q 15/24 |
| | | | | 333/21 A |
| 6,970,138 | B2 * | 11/2005 | McCandless | H01Q 15/24 |
| | | | | 333/21 A |
| 2002/0080079 | A1 * | 6/2002 | McCandless | H01Q 15/24 |
| | | | | 343/772 |
| 2004/0183616 | A1 * | 9/2004 | McCandles | H01Q 15/24 |
| | | | | 333/21 A |
| 2005/0146479 | A1 * | 7/2005 | Stenger | H01P 1/047 |
| | | | | 343/772 |
| 2007/0069966 | A1 * | 3/2007 | Rolnik | H01Q 21/0006 |
| | | | | 343/770 |
| 2013/0041576 | A1 * | 2/2013 | Switkes | G08G 1/167 |
| | | | | 701/123 |
| 2013/0222081 | A1 * | 8/2013 | Nelson | H01P 1/171 |
| | | | | 333/21 A |
| 2017/0040708 | A1 * | 2/2017 | Takahashi | H01P 1/165 |
| 2017/0244173 | A1 * | 8/2017 | Moon | H01Q 13/10 |

OTHER PUBLICATIONS

International Search Report issued in co-pending International Patent Application No. PCT/US2018/064769, ISA/KR, Korean Patent Office, dated Apr. 11, 2019, 3 pages.

Written Opinion issued in co-pending International Patent Application No. PCT/US2018/064769, ISA/KR, Korean Patent Office, dated Apr. 11, 2019, 9 pages.

* cited by examiner

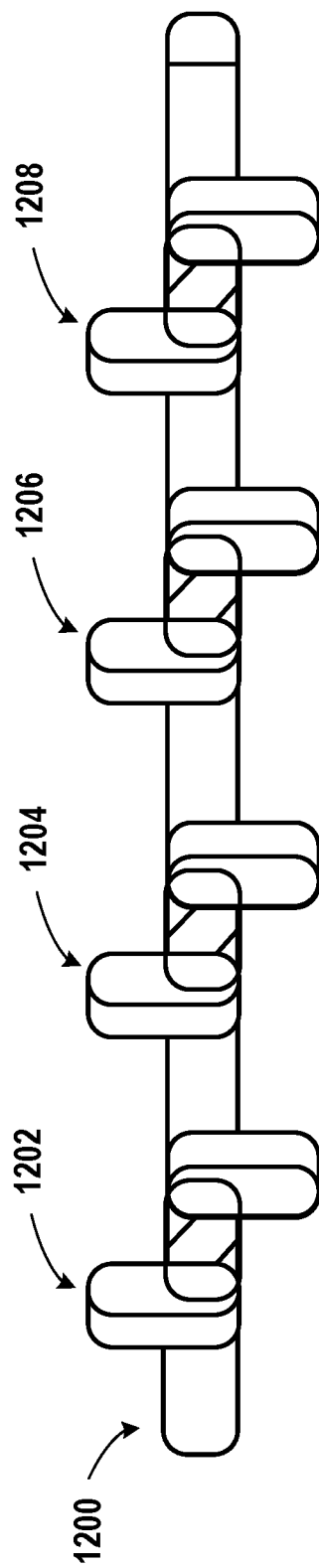
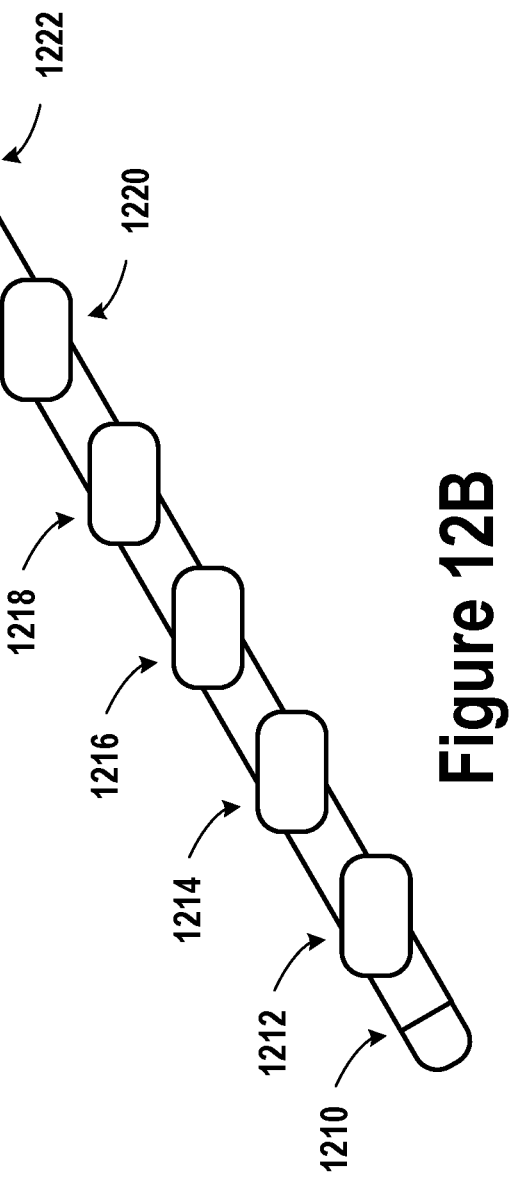

ADAPTIVE POLARIMETRIC RADAR ARCHITECTURE FOR AUTONOMOUS DRIVING

BACKGROUND

Radio detection and ranging (RADAR) systems can actively estimate distances to features in the environment by emitting radio signals and detecting returning reflected signals that reflect off surfaces in the environment. As a result, distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate.

Some systems may also estimate relative motion of reflective objects based on Doppler frequency shifts in the received reflected signals. Directional antennas (e.g., array antennas) can be used for the transmission and/or reception of signals to associate each range estimate with a bearing. More generally, directional antennas can also be used to focus radiated energy on a given field of view of interest. Combining the measured distances and the directional information allows for the surrounding environment features to be identified and/or mapped. The radar sensor can thus be used, for instance, by an autonomous vehicle control system to avoid obstacles indicated by the sensor information.

SUMMARY

Examples embodiments involve adjusting the polarization of one or multiple antennas operating on a radar unit. In some examples, adjusting the polarization of a radar antenna involves using a polarization filter that causes the antenna to transmit or receive radar signals radiating in a polarization that differs from the polarization that the antenna was originally designed for. For instance, a polarization filter can be attached to or generated within a radar unit to cause one or multiple antennas to operate within a different polarization. In other examples, adjusting the polarization of a radar antenna involves modifying the inner configuration of the radar unit during development of the radar unit in order to twist (e.g., modify) the polarization of the radar antenna. For instance, the additional twist modification within a radar unit can cause electromagnetic waves traversing inside the radar unit to twist in order to output at a desired polarization.

In one aspect, the present application describes a radar unit. The radar unit includes a plurality of transmission antennas configured to transmit radar signals having a first polarization, and a plurality of reception antennas configured to receive radar signals having the first polarization. The radar unit also includes a polarization filter coupled to at least a portion of the plurality of transmission antennas and the plurality of reception antenna. Particularly, the polarization filter causes a subset of the transmission antennas of the plurality of transmission antennas to transmit radar signals having a second polarization, and wherein the polarization filter causes a subset of the reception antennas of the plurality of reception antennas to receive radar signals having the second polarization.

In another aspect, the present application describes a radar system. The radar system includes a plurality of transmission antenna configured to transmit radar signals having a first polarization and a plurality of reception antennas configured to receive radar signals having the first polarization. The radar system also includes a polarization filter coupled to at least a portion of the plurality of transmission antennas and the plurality of reception antennas. Particularly, the polarization filter causes a subset of the transmission antennas of the plurality of transmission antennas to transmit radar signals having a second polarization. In addition, the polarization filter also causes a subset of the reception antennas of the plurality of reception antennas to receive radar signals having the second polarization.

In yet another aspect, the present application describes a method of signaling with a radar system. The method includes transmitting one or more radar signals using an array of transmission antennas. For instance, the array of transmission antennas is configured to transmit radar signals having a first polarization. Additionally, a polarization filter is coupled to the array of transmission antennas and causes the array of transmission antennas to transmit the one or more radar signals having a second polarization. The method further includes receiving the one or more radar signals using an array of reception antennas. For instance, the array of reception antennas is configured to receive radar signals having the first polarization. Further, the polarization filter is coupled to the array of reception antennas and causes the array of reception antennas to receive the one or more radar signals having the second polarization.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 12A illustrates a twisted antenna configuration, according to example embodiments.

FIG. 12B illustrates another twisted antenna configuration, according to example embodiments.

DETAILED DESCRIPTION

Figure 1:
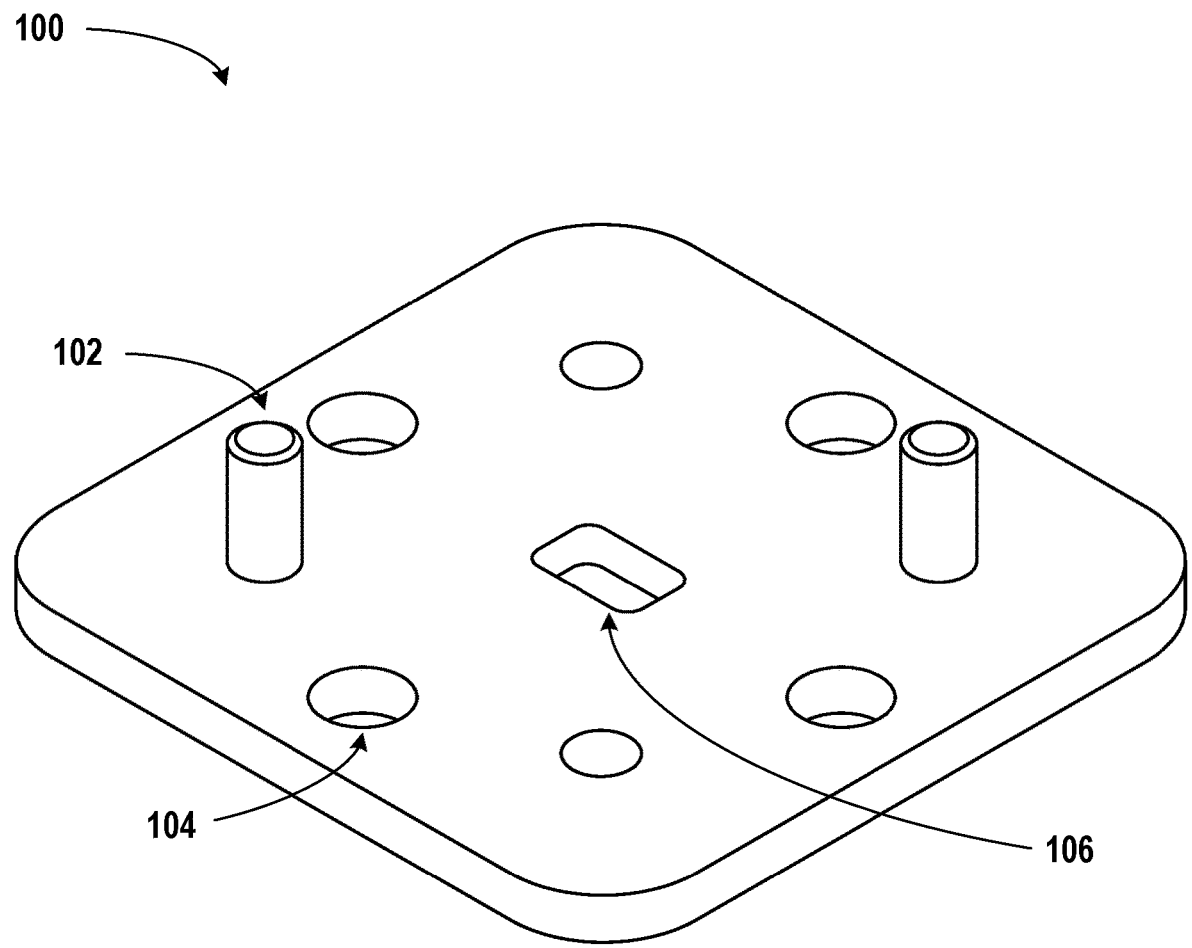
FIG. 1 illustrates a unit cell of a polarization filter, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

As discussed above, a radar system can use one or multiple transmission antennas to emit radar signals in predetermined directions to measure the environment. Upon coming into contact with surfaces in the environment, the radar signals can reflect or scatter in multiple directions. A portion of the radar signals may reflect back towards the radar system and are captured by one or multiple reception antennas. Received reflected signals can then be processed to determine locations of surfaces relative to the radar system.

Due to the ability to measure distances to features as well as motion of moving features within an environment (e.g., motion of the moving feature, relative motion of the feature with respect to the radar platform, and/or a combination of motion), radar systems are increasingly used to assist with vehicle navigation and safety. Particularly, vehicles may rely upon a radar system during autonomous or semi-autonomous operation to enable a vehicle control system to detect, for example, nearby vehicles, road boundaries, weather conditions, traffic signs and signals, and pedestrians, among other features within the environment surrounding the vehicle. As the number of vehicle radar systems continues to grow, there is a desire for affordable radar units that can accurately measure the surrounding environment of the radar, e.g., the surrounding environment of a vehicle, and also operate in an environment with multiple vehicles having radar systems.

Example embodiments presented herein include low-cost radar units that can mount at various positions and orientations on a vehicle to capture accurate measurements of the vehicle's environment. Particularly, some example radar units described herein may include one or multiple polarization filters that can manipulate the polarizations in which the transmission and reception antennas transmit or receive radar signals. As such, the position, configuration, and influence that a polarization filter has on a radar unit can vary within examples.

To illustrate an example implementation, a radar unit may include a transmission array and a reception array with each array consisting of one or multiple antennas configured to initially transmit or receive radar signals in particular polarizations. Polarization, such as the polarization of a radar signal, represents a property that applies to transverse waves (e.g., electromagnetic radar signals). In particular, polarization specifies the geometrical orientation of the oscillations of a transverse wave. For instance, linear polarization is the confinement of the electric field vector to a given plane along the direction of propagation.

To further elaborate, if a radar signal has a vertical orientation during travel (i.e., the radar signal alternates in an up and down path as the signal travels), the radar signal can be described as a vertical linear polarized radar signal. When a radar signal has a horizontal orientation during travel (i.e., the radar signal alternates between side to side along a parallel plane as the signal travels), the radar signal can be described as a horizontal linear polarized radar signal. These polarizations are not the only possible polarizations that radar signals may traverse. Rather, radar signals can also travel along other polarizations, such as slanted polarizations that traverse between horizontal linear and vertical linear polarizations. For example, a radar signal traveling at a slanted polarization may travel at positive or negative forty-five (45) degrees from a horizontal plane.

As such, radar units are often designed such that antennas transmit and receive in particular polarizations. For instance, a radar unit may include an array of transmission antennas and an array of reception antennas that both transmit or receive radar signals in a particular polarization (e.g., vertical linear polarization). Radar units can sometimes have a particular design to enable mass production. In these situations, although a radar unit can capture measurements in a particular polarization, the radar unit might be unable to capture measurements in other polarizations. As a result, a radar system operating on a vehicle or other entity may benefit from additional radar units designed to transmit and receive in other polarizations in order to enable the radar system to measure the environment in multiple polarizations.

Some examples presented herein include using polarization filters that enable radar units designed to operate in a particular polarization or polarizations to operate in other polarizations. Thus, although the transmission array and/or reception array of a radar unit may include antennas configured to transmit or receive radar signals in a particular polarization or polarizations, the radar unit may further include one or multiple polarization filters that can alter the polarization that all or some of the antennas transmit and/or receive radar signals.

A polarization filter can couple to various positions relative to radiating antennas in order to manipulate the polarity of the antennas. For instance, the polarization filter can couple to the radar unit directly under radiating elements or in another layer of the radar unit. Additionally, a polarization filter can also adjust the polarization of a transmitting or receiving antenna to various degrees. For instance, a radar unit can be configured with one or multiple polarization filters to adjust from transmitting (and receiving) multiple signals in a given polarization to another polarization that is orthogonal to original polarization of the radar unit design.

When a signal is orthogonal to another signal, this means that each signal is capable of being resolved independently of the other signal due to the way each signal traverses through the environment. For example, when a radar unit transmits both vertically linear polarized and horizontally linear polarized signals, these signals may be orthogonal to each other. In practice, the two orthogonal can be reflected by objects in the environment and received by the radar unit. As such, the vertically polarized reflection signals may be received by a vertically polarized antenna and the horizontally polarized reflection signals may be received by a horizontally polarized antenna. Because a vertically polarized signal is orthogonal to a horizontally polarized signal, a vertically polarized antenna will receive none (or a very small percentage) of a horizontally polarized signal and a horizontally polarized antenna will receive none (or a very small percentage) of a vertically polarized signal. Additionally, this can allow radar to be able to pick up any cross polarized components of a radar signal reflected by the ground or other objects that exhibit cross polarization conversions, such as complex terrain, shrubberies, trees, snow, rain, and complex targets, etc. This can allow a vehicle control system or another system to use radar to analyze the environment more thoroughly, including measuring and analyzing a driving scene with various polarizations.

As discussed above, a polarization filter represents a layer of material that can manipulate operation of one or multiple antennas of a radar unit. In some embodiments, a polarization filter can cause a subset of transmission antennas to transmit radar signals in a second polarization despite the transmission antennas having an initial design that causes them to transmit radar signals in a first polarization without the polarization filter. For example, when a polarization filter is positioned on a transmission antenna configured to transmit vertically linear polarized radar signals, the polarization filter can adjust the output of the transmission antenna such that the transmission antenna transmits radar signals that are differently polarized (e.g., horizontal linear polarized). Additionally, in further example embodiments, a radar unit may include one or multiple polarization filters that cause transmission antennas to transmit and reception antennas to receive radar signals radiating at slanted polarizations at approximately positive and negative forty-five degrees from a horizontal plane Some example embodiments may involve using multiple radar polarization filters to adjust polarizations of one or multiple antennas of a radar unit. For example, a radar unit may include a first polarization filter coupled to a first subset of its antennas and a second polarization filter coupled to a second subset of its antennas. In the above implementation, the first polarization filter may cause the first subset of antennas to transmit and receive radar signals traveling in a first polarization (e.g., a vertical linear polarization) and the second polarization filter may cause the second subset of antennas to transmit and receive radar signals traveling in a second polarization (e.g., a horizontal linear polarization). Other examples of radar units may involve additional polarization filters. In further examples, polarization filters can overlap.

Some example radar units can have various configurations, including some radar units with antennas designed to transmit and/or receive radar signals in multiple polarizations. For instance, a radar unit may have arrays of antennas designed such that each array transmits or receives radar signals in a particular polarization, such as horizontal linear polarization, vertical linear polarization, and slanted linear polarizations (e.g., approximately positive and negative forty-five degrees from the horizontal plane). As such, these radar units that are capable in using radar signals in multiple polarizations may still include one or more polarization filters to modify the performance of all or a subset of its antennas.

Parameters of a polarization filter can vary within examples. For instance, the size, thickness, and design of polarization filters may differ depending on the design and desired performance of the radar units. In some examples, a radar unit may use a single polarization filter that covers all or a set of the antennas on the radar unit. In other examples, a radar unit may include multiple polarization filters that may or may not overlap. A radar unit that includes multiple polarization filters can have gaps in between the polarization filter or the polarization filters may also align within any space in between.

In addition, in some embodiments, a polarization filter may be built into the radar unit. For instance, the polarization filter can be generated as a portion (e.g., a layer) of the radar unit. The polarization filter can be the top layer positioned above antennas or as another layer. In other embodiments, a polarization filter may be configurable to attach to a radar unit. For instance, the polarization filter may couple to the radar unit via fasteners or adhesive. As such, some example embodiments can involve polarization filters that are adjustable and can couple to and switch between different portions of the same radar unit.

In further examples, one or multiple polarization filters may operate in accordance with one or multiple rotation components. For instance, a radar unit may include a rotation component that can adjust a position or positions of one or multiple polarization filters. Adjusting the position of a polarization filter can cause the polarization filter to modify the polarization of antennas on the radar unit in a manner that dependents on the current position of the polarization filter. A rotation component can adjust the position of a polarization filter using various techniques or sources of power to perform the adjustment.

In some examples, the rotation component is a microelectromechanical system (MEMS). MEMS and other potential rotation components may be made using microfabrication techniques. Through the use of MEMS devices, a radar unit may be able to adjust the polarization of one or more radar units in situ. By way of example, an in situ adjustment allows the radar unit (or vehicle) to adjust the polarization of the radar unit without having to physically replace the radar hardware on the vehicle.

The configuration, position, and orientation of a transmission or reception antenna as well as the underlying waveguide channel can influence the polarization in which the antenna transmits or receives radar signals, the width and distance of the transmission or reception, and direction of operation of the antenna. As such, different layouts of radar units are presented herein that depict radar units capable of various types of operation, including close range, mid-range, and far-range from a vehicle or other device. These different layouts of radar units can include one or multiple polarization filters that adjust the polarization of transmission as well as reception by given antennas.

In some example embodiments, the configuration of a radar unit can further influence the performance of antennas of the radar unit. In particular, a radar unit may be configured internally to additionally modify (e.g., twist) the polarization of electromagnetic waves to an extent desired before antennas transmit the modified electromagnetic waves as desired Likewise, the radar unit may be configured to receive reflections of radar signals and internally modify (e.g., twist) the received signals to a polarization desired. As an example, a radar unit may receive and twist electromagnetic waves to a desired polarization (e.g., slanted polarization).

Radar units capable of operating in multiple polarizations can help reduce interference and jamming that can occur when multiple vehicles or devices use radar in the same area. Interference or jamming can cause a radar unit to receive radar signals that do not accurately represent the environment from the perspective of the radar unit. For instance, the radar unit positioned on a vehicle may receive unwantedly receive a radar signal that was transmitted in the same range and polarization by a radar system of a different vehicle. Further, all the different transmissions and reflections of radar signals can produce noise that impacts the performance of radar units.

By way of example, if two vehicles are driving toward one another, and both are transmitting radar signals with vertical polarization (or horizontal polarization), each vehicle may receive some radar signals transmitted by the other vehicle. These radar signals from the other vehicle may jam (or otherwise interfere) with the radar units of the vehicle. However, if the radar signals from the two vehicles are orthogonal to each other, then the signals will much less likely jam or interfere with the other vehicle's radar.

Example radar units that can transmit and receive in more than one polarization can potentially circumvent jamming and interference by transmitting and receiving radar signals in polarizations that differ from the polarization used by nearby radar systems. Likewise, a radar unit can selectively transmit and receive radar signals in one or more of multiple polarizations (e.g., all four). The radar system may use the accumulation of measurements from the multiple polarizations to measure the environment. Thus, one or more radar units may be able to image a field of view of the radar unit in one or more polarizations.

Further, a radar unit operating in multiple polarizations can enable further analysis of an environment. For instance, the radar system can detect water (e.g., puddles and/or weather conditions) positioned on or near the roadway based on radar measurements in multiple polarizations. Because water has polarization-specific reflection properties, changing polarizations may enhance the ability to detect water on a roadway. A vehicle control system can use enhanced detection from different polarizations to avoid flooded roadways or otherwise navigate around environments unfit for navigation. Likewise, measurements of radar signals in multiple polarizations can assist in detecting metallic traffic signs, such as stop signs and street signs.

In some examples, polarimetric measurements can assist with decomposing complex RF reflective objects (e.g., cars, road signs) in the environment into canonical scattering components, such as plates, edges, cylinders, and trihedrals, etc. For example, the radar signals reflecting off the edges of the metallic traffic signs in multiple polarizations can assist the radar system detect the location and estimate the boundaries of a sign. As a result, the measurements can help form a rich and discriminative feature space that can potentially be used for target classification and object identification. Further, in addition to the multi-look nature of polarimetric measurements, a system may use the measurements to characterize the polarimetric spectrum of targets and potentially provide classification capabilities. For instance, the system may identify traffic signs based on detected shapes, road barriers, other vehicles, pedestrians, and other features within an environment using radar measurements and analysis.

The following detailed description may be used with an apparatus having one or multiple antenna arrays that may take the form of a single-input single-output single-input, multiple-output (SIMO), multiple-input single-output (MISO), multiple-input multiple-output (MIMO), and/or synthetic aperture radar (SAR) radar antenna architecture.

In some embodiments, radar antenna architecture may include a plurality of "dual open-ended waveguide" (DOEWG) antennas. In some examples, the term "DOEWG" may refer to a short section of a horizontal waveguide channel plus a vertical channel that splits into two parts, where each of the two parts of the vertical channel includes an output port configured to radiate at least a portion of electromagnetic waves that enter the antenna. Additionally, a plurality of DOEWG antennas may be arranged into an antenna array. However, this technology is not limited to DOEWG antennas, other antennas may be used within the context of the present disclosure as well.

An example antenna architecture may comprise, for example, multiple metal layers (e.g., aluminum plates) that can be machined with computer numerical control (CNC), aligned properly, and joined together. The first metal layer may include a first half of an input waveguide channel, where the first half of the first waveguide channel includes an input port that may be configured to receive electromagnetic waves (e.g., 77 GHz millimeter waves) into the first waveguide channel. The first metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels.

Some example automotive radar systems may be configured to operate with frequencies in the IEEE W band (75-110 Gigahertz (GHz)) and/or the NATO M band (60-100 GHz). In one example, the present system may operate at an electromagnetic wave frequency of 77 GHz, which corresponds to millimeter (mm) waves having an electromagnetic wavelength (e.g., 3.9 mm for 77 GHz). These radar systems may use antennas that can focus the radiated energy into beams in order to enable the radar system to measure an environment with high accuracy, such as the surrounding environment around an autonomous vehicle. Such antennas may be compact, efficient (i.e., there should be little 77 GHz energy lost to heat in the antenna, or reflected back into the transmitter electronics), and inexpensive and easy to manufacture.

In some example embodiments, a polarization filter may be disposed between two layers of the antenna. One of the two layers may include an array of waveguide antenna elements (e.g., waveguides of DOEWG antennas) used for radiating or receiving signals. The other layer may include waveguide output ports (i.e., ports between the polarization filter and the surrounding environment).

The polarization filter may be positioned such that the rounded rectangular polarization-modification channels are positioned with respect to the waveguide antenna elements and/or the waveguide output ports (e.g., rotated at an angle between 44 and 46 degrees with respect to the waveguide antenna elements and at an angle between 44 and 46 degrees with respect to the waveguide output ports).

The waveguide antenna elements and/or the waveguide output ports may be rectangular in shape, in some embodiments. In alternate embodiments, the waveguide antenna elements and/or the waveguide output ports may be circular in shape. Other shapes are also possible.

The polarization filter may be fabricated using CNC machining or metal-plated plastic molding, in various embodiments. The polarization filter could be fabricated of metal and/or dielectric, in various example embodiments.

The rounded rectangular channels may serve as resonant chambers that can alter the polarization of incoming electromagnetic waves. For example, high energy leakage from one polarization to another polarization (e.g., from a horizontal $TE_{10}$ polarization to a vertical $TE_{10}$ polarization) may occur within the chamber. Unlike alternative methods of changing polarization in waveguides that make use of physical twists in a waveguide occurring over a many wavelength distance, the thickness of the polarization filter can be less than a wavelength (e.g., between a half and a whole wavelength of corresponding input electromagnetic waves) while still achieving sufficient polarization conversion. The rounded rectangular polarization-modification channels may also be designed such that evanescent waveguide modes emanating from the channel die out sufficiently quickly as they propagate away from the channel. Because of both of these factors, less energy loss may occur during the polarization conversion, resulting in increased energy efficiency when compared with alternate methods of rotating/changing polarization.

In some examples, a radar system may include one or more radar units configured to adjust the polarization of radar signals. Particularly, a radar unit within the system may be configured to operate as a DOEWG that receives an electromagnetic wave input from a feed guide and divides the electromagnetic waves into multiple channels. The radar unit may further include a configuration that can receive the divided and pre-twisted electromagnetic wave from the neck of the feed waveguide and provide additional twisting (or otherwise modification) of the divided electromagnetic waves to one or multiple desired polarizations within channels. For instance, the additional twisting may cause electromagnetic waves to adjust from horizontal linear polarization to a slanted polarization.

As such, the radar unit may include a configuration that allows a sufficient propagation path to stabilize the twisted electromagnetic waves such that all (or a portion) of the parasitic evanescent waves cease to exist and the wanted propagating electromagnetic waves survive in the desired twisted angle (i.e., at the desired polarization). In some examples, the radar unit may further include an impedance match to free space at the end of the guide in order to assist with radiating the electromagnetic waves as radar signals into the environment. Additionally, since twisting electromagnetic waves may occur in the size of radar units capable of attaching to vehicles, the configuration allowing twisting of the electromagnetic waves may be constructed using the CNC machining process. Further, the twisted configuration may be included in various types of radar units, such as radar units configured with different arrays of antennas. For example, a radar unit that internally twists electromagnetic waves to a desired polarization may include a one by ten (1×10) radiating element array.

Based on the shape and the materials of the corresponding polarization-modification channels and waveguides, the distribution of propagating energy can vary at different locations within the antenna, for example. The shape and the materials of the polarization-modification channels and waveguides define the boundary conditions for the electromagnetic energy. Boundary conditions are known conditions for the electromagnetic energy at the edges of the polarization-modification channels and waveguides. For example, in a metallic waveguide, assuming the polarization-modification channel and waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the polarization-modification channels and waveguides.

Maxwell's Equations may define several modes of operation for any given polarization-modification channel or waveguide. Each mode has one specific way in which electromagnetic energy can propagate through the polarization-modification channel or waveguide. Each mode has an associated cutoff frequency. A mode is not supported in a polarization-modification channel or waveguide if the electromagnetic energy has a frequency that is below the cutoff frequency. By properly selecting both (i) dimensions and (ii) frequency of operation, electromagnetic energy may propagate through the polarization-modification channels and waveguides in specific modes. The polarization-modification channels and/or the waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-modification channel or waveguide (e.g., assuming a rectangular waveguide). However, a suffix number of zero indicates that there is no variation of the field with respect to that direction. For example, a $TE_{10}$ mode indicates the polarization-modification channel or waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

The antennas may be used on a transmit side, a receive side, or both transmit and receive sides of a radar system. Further, the addition of a polarization filter can allow for antennas with different native polarization orientations to communicate with one another using radio communications. For example, an antenna having a vertical polarization may transmit a signal to a receiving antenna that would natively have a horizontal polarization. However, by including a polarization-modification layer and waveguide output ports, the receiving antenna can receive and convert the vertically polarized signal, thereby enabling communication between the two components.

In some applications, the inclusion of one or multiple polarization filters can allow various radars within a radar system to use different polarizations to perform measurements. Such a capability may allow multiple viewpoints (e.g., one of horizontally polarized electromagnetic energy and one of vertically polarized electromagnetic energy) of a single scene. For example, certain types of inclement weather (e.g., snow, rain, sleet, and hail) may adversely affect radar signaling. The use of multiple polarizations could reduce such an adverse effect.

Additionally or alternatively, different radars using different polarizations may prevent interference between different radars in the radar system. For example, the radar system may be configured to interrogate (i.e., transmit and/or receive radar signals) in a direction normal to the direction of travel of an autonomous vehicle via the synthetic aperture radar (SAR) functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radars units having orthogonal polarizations so that each radar unit does not interfere with the other radar unit. Thus, without having to redesign radar units, polarization filters can cause radar units to operate in different polarizations.

In some embodiments, multiple polarization filters could be cascaded together. This could increase the bandwidth of frequencies over which effective polarization conversion can occur using the corresponding antenna. Further, various combinations of cascaded polarization filters and various dimensions of the rounded rectangular polarization channels within the cascaded polarization-modification layers could serve as a frequency filtering mechanism. Thus, the associated antennas could select specific polarizations within specific frequency bands over which to perform measurements, thereby introducing an additional method of reducing interference and providing additional radar channels for use by various different radar components in a radar system.

Referring now to the figures, FIG. 1 illustrates polarization filter 100, which includes pegs 102, through-holes 104, and polarization-modification channel 106. Polarization filter 100 can have other configurations and may be generated in various types of materials, such as metal fabricated using CNC. Further, polarization filter 100 can be a component of a radar unit, but can have other applications as well. Additionally, polarization filter 100 may be an example of a single polarization unit that can be replicated multiple times over a plurality of antennas in order to rotate the polarization transmitted by said antenna.

Multiple polarization filter 100 could further be cascaded to allow for additional rotation of polarization. Further, the cascaded polarization filters could permit an increased bandwidth of frequencies over which polarization conversion can occur.

Figure 4:
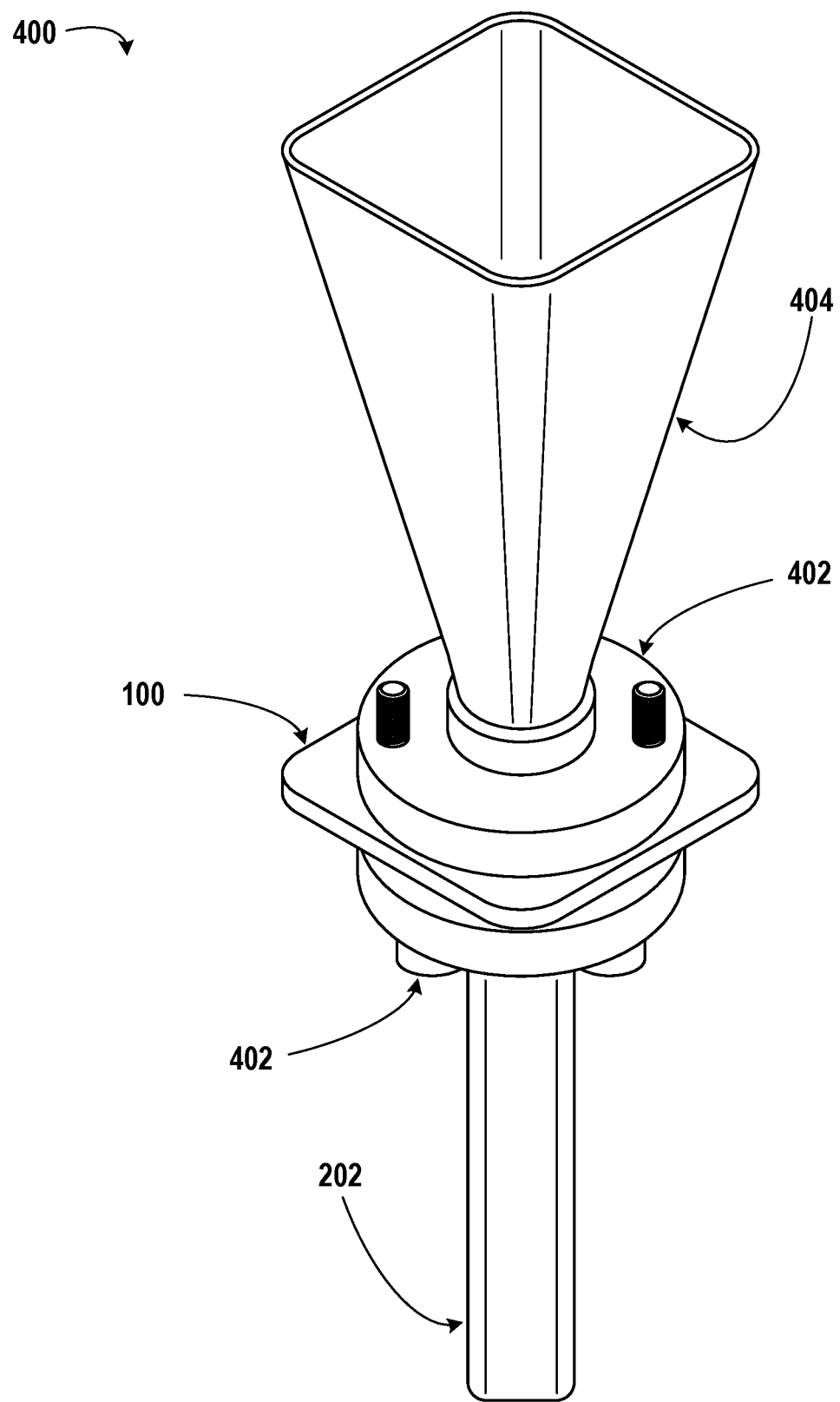
FIG. 4 illustrates a waveguide, a unit cell of a polarization filter, and a horn antenna, according to example embodiments.

Pegs 102 can enable polarization filter 100 to connect to and/or align with other components. For example, pegs 102 may align polarization filter 100 with alignment holes on other radar components, such as waveguides or antennas (e.g., a horn antenna as illustrated in FIG. 4). In alternate embodiments, there may be more than two pegs 102, fewer than two pegs 102, or no pegs 102 at all.

Through-holes 104 can perform similar tasks to those performed by pegs 102 (e.g., connect and/or align polarization filter 100 with other components). For example, in some embodiments, through-holes 104 may be threaded, allowing through-holes 104 to be engaged by fasteners to connect polarization filter 100 to other radar components. As illustrated in FIG. 1, there are four through-holes 104. In alternate embodiments, there may be more than four through-holes 104, fewer than four through-holes 104, or no through-holes 104 at all.

Polarization-modification channel 106 represents a portion of polarization filter 100 in which electromagnetic waves undergo a modification of polarization. The thickness and possibly other parameters of the polarization-modification channel 106, and therefore in some embodiments the thickness of the main body of the entire polarization filter 100, may be defined based on one or more wavelengths expected to undergo polarization modification using polarization filter 100 (e.g., if polarization filter 100 is being used in radar applications that utilize 77 GHz electromagnetic waves, the thickness of polarization filter 100 could be around 3.9 mm, or about one wavelength).

An angle of polarization-modification channel 106 relative to one or more mounting points (e.g., pegs 102 or the through-holes 104) may define how much polarization rotation occurs when polarization filter 100 acts on an electromagnetic wave. In the example embodiment illustrated in FIG. 1, polarization-modification channel 106 is at a 45-degree angle relative to a line between pegs 102. Therefore, if a waveguide aligns with pegs 102 for example, electromagnetic waves passing through polarization-modification channel 106 will undergo a polarization rotation of 45 degrees. This results in the antenna transmitting or receiving radar signals that radiate at a different polarization than the antenna was originally configured for. Other angles are also possible (e.g., 44 degrees or 46 degrees).

In some embodiments, polarization-modification channel 106 could be filled or partially filled with a material other than air. For example, a dielectric could be used to fill polarization-modification channel 106 to alter a resonant wavelength inside of polarization-modification channel 106, thereby altering an input wavelength range over which polarization-modification can occur using polarization filter 100.

In some embodiments, the shape of polarization-modification channel 106 could be changed. For example, polarization-modification channel 106 could be circular or substantially circular, allowing for an alignment of polarization filter 100 with circular waveguides. In the embodiment illustrated in FIG. 1, polarization-modification channel 106 has a shape of a rounded rectangle. Geometrically, such a shape can be defined as the shape obtained by taking the convex hull of four equal circles of a given radius and placing the centers of the four circles at the four corners of a rectangle having a first side length and a second side length.

Figure 2:
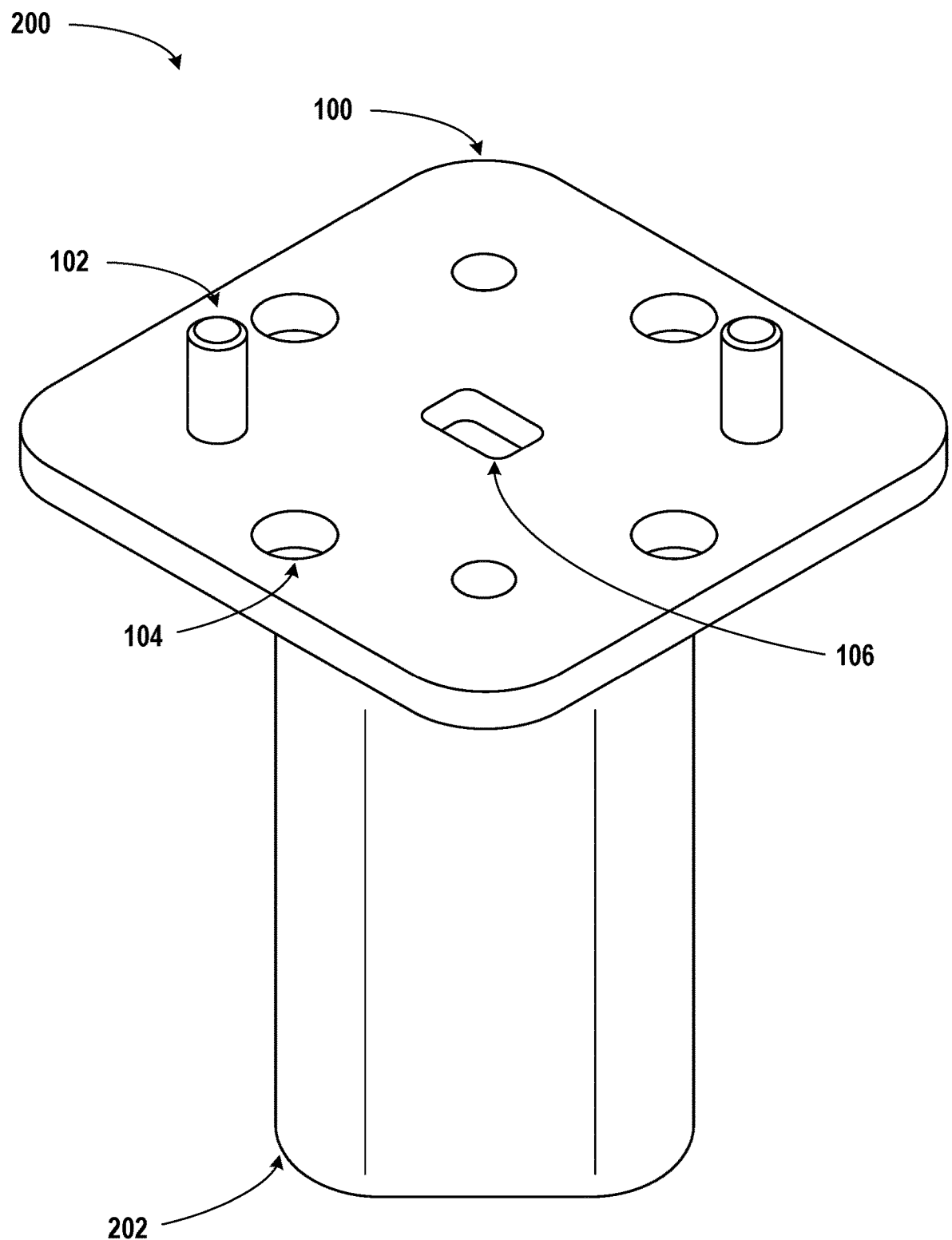
FIG. 2 illustrates a unit cell of a polarization filter and a waveguide, according to example embodiments.

FIG. 2 illustrates polarization filter 100 and waveguide 202. As shown, FIG. 2 includes polarization filter 100 illustrated in FIG. 1 (including pegs 102, through-holes 104, and polarization-modification channel 106), as well as a rounded rectangular waveguide 202 forming system 200. As such, rectangular waveguide 202 and polarization filter 100 may have features sized to accommodate electromagnetic waves having a frequency of 77 GHz, for example. Other frequencies inside and outside of the radio spectrum are also possible.

As illustrated in FIG. 2, a long end of a port on waveguide 202 (e.g., the length of waveguide 202) may lie parallel to a line between pegs 102 of polarization filter 100. As a result, polarization-modification channel 106 may couple at a 45-degree angle relative to the orientation of the port on rectangular waveguide 202 (other angles are also possible). This can allow the system 200 to be configured to radiate electromagnetic waves that have a polarization that is rotated by an angle (e.g., between 44 and 46 degrees) relative to an input polarization at a base of waveguide 202 (e.g., a port on a side of waveguide 202 opposite of polarization filter 100).

In other embodiments, system 200 may receive electromagnetic waves having a particular polarization at polarization-modification channel 106 and rotate or otherwise adjust the polarization of the accepted electromagnetic polarization by an angle between 44 and 46 degrees (i.e., act as a receiver rather than a transmitter). System 200 can enable communication between a component on one end (e.g., the transmit end) of a radar system to communicate with a component on a second end (e.g., a receive end) of the radar system, even if the components have different inherent polarizations. For example, the polarization-modification channel 106 could be tuned to an appropriate angle that corresponds to the difference in polarizations between the two components.

In alternate embodiments, rectangular waveguide 202 could instead be replaced by a circular waveguide, an elliptical waveguide, or a rectangular waveguide. In such embodiments, polarization-modification channel 106 may consequently be designed of a different shape (e.g., circular, elliptical, or rectangular).

Additionally or alternatively, polarization filter 100 could be used to select specific polarizations or frequencies through filtering. Such filtering considerations could also lead to variations in the shape, size, or filling material used within polarization-modification channel 106. In some embodiments, polarization-modification channel 106 may be designed to transmit, and possibly alter, electromagnetic waves having circular or elliptical polarization.

In addition, polarization filter 100 can act as a corrective iris on top of the rectangular waveguide. For example, if the rectangular waveguide is misshapen (e.g., one side of the rectangular waveguide is bent), polarization-modification channel 106 can have a shape that compensates for the shape of the rectangular waveguide.

As discussed above, system 200 may form a component of a radar antenna or a radio communication system, for example. Various other applications for system 200 are also possible. In such alternate applications, dimensions of waveguide 202 or polarization filter 100 can have other configurations that account for a given wavelength corresponding to electromagnetic waves used in the respective application, for example.

Figure 3:
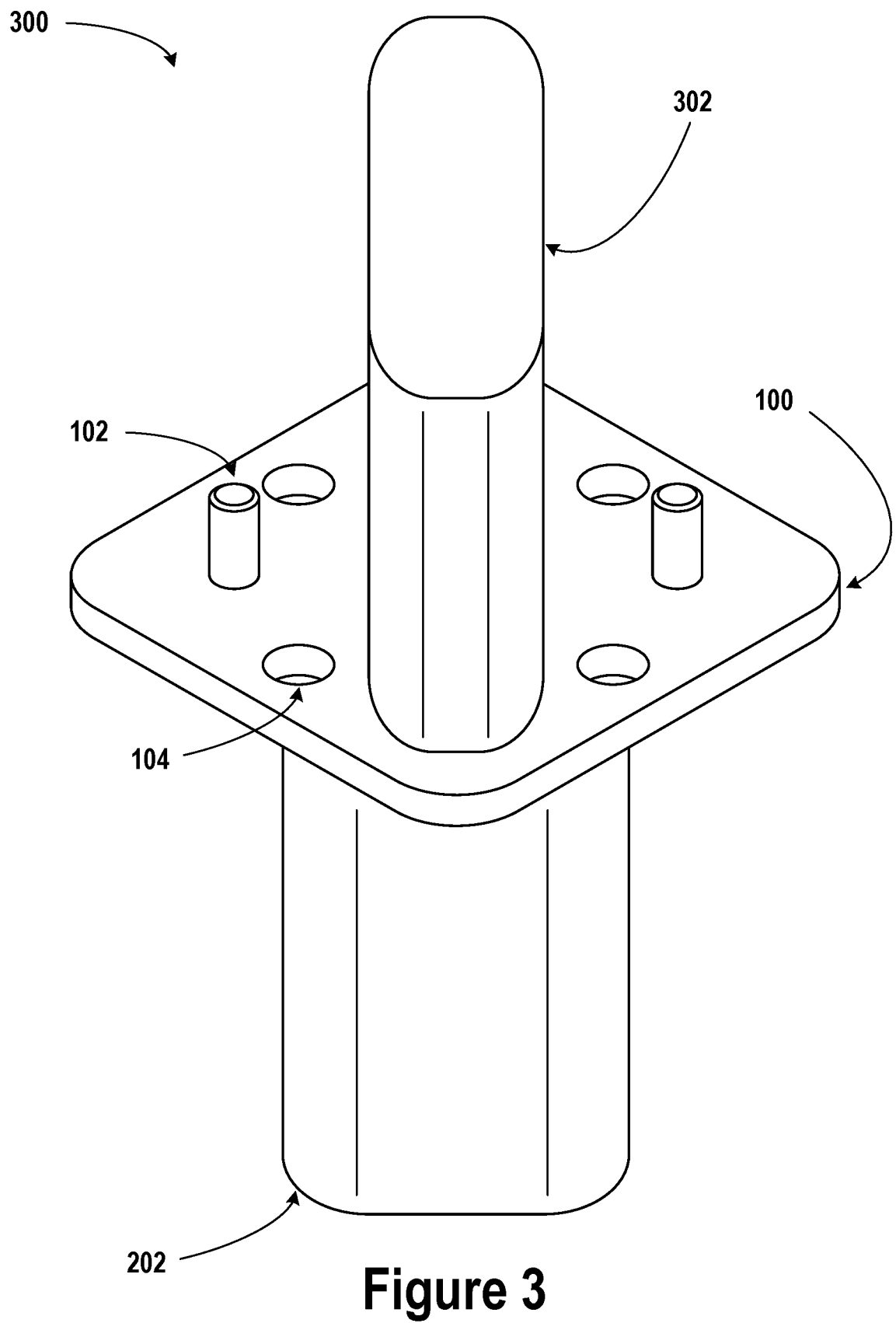
FIG. 3 illustrates a unit cell of a polarization filter and two waveguides, according to example embodiments.

FIG. 3 illustrates polarization filter 100 and waveguides 202, 302. As illustrated, polarization filter 100 may be polarization filter 100 illustrated in FIGS. 1 and 2, and waveguide 202 may be the rounded rectangular waveguide 202 illustrated in FIG. 2.

In the embodiment depicted in FIG. 3, waveguide 202 may be referred to as the lower waveguide 202, and waveguide 302 may be referred to as the upper waveguide 302. Polarization filter 100, the lower rectangular waveguide 202, and the upper rectangular waveguide 302 can together comprise a system 300. As illustrated, the system 300 may be similar to the system 200 illustrated in FIG. 2 with an addition of the upper rectangular waveguide 302 seated on or fastened to a side of polarization filter 100 opposite the side of polarization filter 100 to which the lower rectangular waveguide 202 is seated or fastened.

As illustrated, the system 300 can be configured to radiate electromagnetic waves that have a polarization rotation of 90 degrees, for example, relative to an input polarization at the base of the lower rectangular waveguide 202. Such an arrangement could allow input electromagnetic waves (e.g., at a port on a side of the lower rectangular waveguide 202 opposite of polarization filter 100) to be rotated from a horizontal $TE_{10}$ polarization to a vertical $TE_{10}$ polarization at the output (e.g., a port on a side of the upper rectangular waveguide 302 opposite of polarization filter 100), for example. Other angular rotations between input and output are also possible.

Alternatively, the system 300 could be used to receive electromagnetic waves of a given polarization at a port of the upper rectangular waveguide 302, and then rotate the polarization of the electromagnetic waves through an angle (e.g., an angle between 75 and 105 degrees) before emitting the electromagnetic waves having the rotated polarization out of a port in the base of the lower rectangular waveguide 202.

In some embodiments, the upper waveguide 302 may represent a waveguide output port of a radiating antenna, for example. Further, the lower waveguide 202 may represent a waveguide antenna element, connected to an electrical circuit within a radar system for example.

In the embodiment illustrated in FIG. 3, the upper waveguide 302 and the lower waveguide 202 may be of similar shapes and sizes, but rotated in orientation with respect to one another (e.g., at an angle between 88 and 92 degrees). Also, in addition to or alternatively to rotation with respect to one another about a vertical axis, one or both of the upper waveguide 302 and the lower waveguide 202 could be rotated with respect to an axis that lies parallel to a plane of the surface of polarization filter 100. In alternate embodiments, the upper waveguide 302 and the lower waveguide 202 may be different lengths, widths, heights, or shapes. Analogous to the system 200 illustrated in FIG. 2, regardless of whether the upper waveguide 302 and the lower waveguide 202 are the same shape or size as one another, one or both of the upper waveguide 302 and the lower waveguide 202 could be circular, elliptical, or rectangular waveguides, as opposed to rounded rectangular waveguides. If the respective shapes of the upper waveguide 302 and the lower waveguide 202 are not equivalent, dimensions of the respective waveguides may be altered to accommodate the shape difference (e.g., if the lower waveguide 202 is a rounded rectangle and the upper waveguide 302 is a rectangle, the lower waveguide 202 may be slightly longer or wider to accommodate equivalent modes to those accommodated by the upper waveguide 302). In still other embodiments, one or both of the upper waveguide 302 and the lower waveguide 202 could be replaced by other components (e.g., photonic components or electronic components).

FIG. 4 illustrates a waveguide 202, a unit cell of polarization filter 100, and a horn antenna 404, according to example embodiments. As illustrated, polarization filter 100 may be the polarization-modification unit cell illustrated in FIGS. 1, 2, and 3, and waveguide 202 may be waveguide 202 illustrated in FIGS. 2 and 3. Polarization filter 100, waveguide 202, and the horn antenna 404 can together comprise a system 400. Also included in the system 400 illustrated in FIG. 4, are two fastening plates 402 used to connect the other components of the system 400 (i.e., waveguide 202, polarization filter 100, and the horn antenna 404) to one another. As illustrated, the system 400 may be similar to the system 200 illustrated in FIG. 2 with an addition of the horn antenna 404 fastened to a side of polarization filter 100 opposite the side to which waveguide 202 is fastened.

As illustrated in FIG. 4, polarization filter 100 may be removably connected to the horn antenna 404 and waveguide 202 using the fastening plates 402. The fastening plates 402, for example, may be directly connected to the horn antenna 404 and waveguide 202, respectively, in a semi-permanent fashion (e.g., welded to the horn antenna 404 and waveguide 202). The fastening plates 402 may then be attached to one another, polarization filter 100, or both, using bolts, as illustrated, for example. The bolts may replace pegs 102 illustrated in FIG. 1. Alternatively, the bolts may be threaded through threaded ports or through-holes defined within pegs 102 or through one or more other through-holes, such as the through-holes 104 illustrated in FIG. 1. Additionally, the system 400 may employ nuts, washers, or both to secure the fastening plates 402 to one another or to polarization filter 100.

In alternate embodiments, the use of fastening plates 402 within the system 400 may be superfluous. For example, the horn antenna 404, waveguide 202 or both may be directly connected (e.g., welded or fastened) to a portion of polarization filter 100, thereby obviating a need to use fastening plates 402. In still other embodiments, the fastening plates 402 may be shaped differently (e.g., rectangular rather than circular).

The horn antenna 404 represents a radiating element of the system 400 illustrated in FIG. 4. The horn antenna 404 may be an alternate radiating element used in place of the upper waveguide 302 illustrated in FIG. 3. Potential advantages of using the horn antenna 404 could include improved directivity, bandwidth, and standing wave ratio (SWR) when compared with alternate antenna radiating elements such as the upper waveguide 302 illustrated in FIG. 3. In alternate embodiments, the horn antenna 404 may have an alternate shape (e.g., a sectoral horn, a conical horn, an exponential horn, a corrugated horn, a dual-mode conical horn, a diagonal horn, a ridged horn, a septum horn, or an aperture-limited horn, as opposed to a pyramidal horn) or be sized in a different way (e.g., a width dimension of an output port of the horn antenna 404 is larger than a length dimension of the output port of the horn antenna 404). Such changes to the horn antenna 404 may be made such that the horn antenna 404 radiates electromagnetic waves of different frequencies more efficiently or corresponding to different polarizations, for example. In alternate embodiments, besides those illustrated in FIGS. 3 and 4, other radiating elements are also possible (e.g., bowtie antennas or corner reflector antennas).

The horn antenna 404 may, analogous to the upper waveguide 302 illustrated in FIG. 3, radiate electromagnetic waves that have a rotated polarization from a polarization that was input to a port at a base of waveguide 202. For example, the polarization could be rotated between 88 and 92 degrees (e.g., from roughly a horizontal $TE_{10}$ polarization to roughly a vertical $TE_{10}$ polarization, or vice versa).

Figure 5:
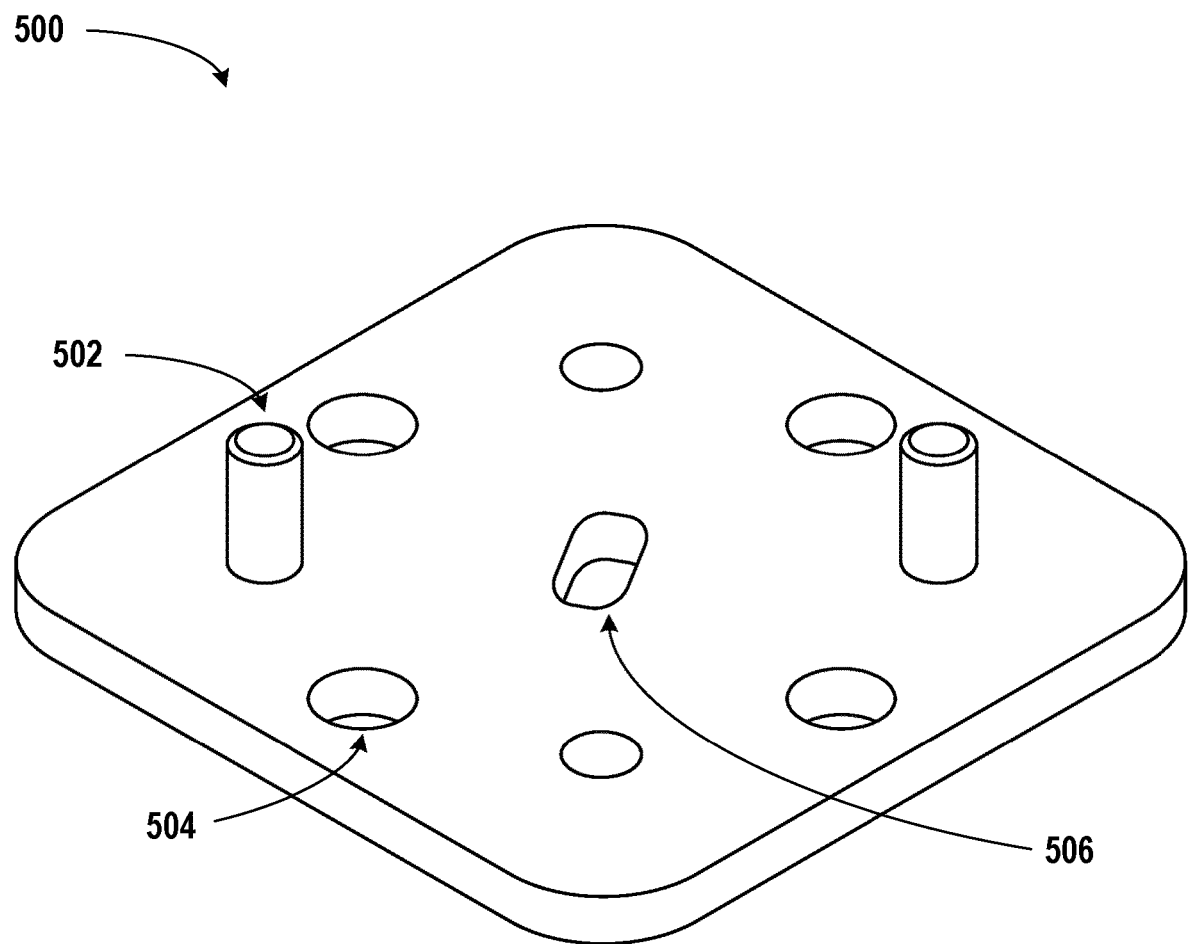
FIG. 5 illustrates a unit cell of another polarization filter, according to example embodiments.

FIG. 5 illustrates a unit cell of another polarization-modification 500, according to example embodiments. Similar to the embodiment illustrated in FIG. 1, the polarization-modification unit cell 500 illustrated in FIG. 5 includes pegs 502, through-holes 504, and a polarization-modification channel 506. The polarization-modification unit cell 500 may be a plate of metal, fabricated using CNC, for example, with other components defined therein (e.g., the polariza-tion-modification channel 506) and/or thereon (e.g., the two pegs 502). While the polarization-modification unit cell 500 may be a component of an antenna or a radar system, the polarization-modification unit cell 500 may be used in various other applications.

Multiple polarization-modification unit cells 500 could further be cascaded to allow for additional rotation of polarization. For example, nine cascaded polarization-modification unit cells, each being similar to polarization-modification unit cell 500, could each be cascaded one after another. Each of the nine cascaded polarization-modification unit cells could have successive polarization-modification channels 506 that are offset 10 degrees from the polarization-modification channels 506 of adjacent polarization-modification unit cells. In this way, the nine cascaded polarization-modification unit cells could rotate polarization of input electromagnetic waves to polarization of output electromagnetic waves by 90 degrees. Further, the cascaded polarization-modification unit cells could permit an increased bandwidth of frequencies over which polarization conversion can occur. For example, a set of cascaded polarization-modification unit cells could act as a broadband (in terms of accepted electromagnetic frequencies) polarization rotating device. In some embodiments, such a device could be capable of rotating any electromagnetic wave having a frequency within the "E-band" (i.e., 60-90 GHz), for example.

Similar to the embodiment illustrated in FIG. 1, pegs 502 can be configured to allow the polarization-modification unit cell 500 to connect to and/or align with other components. For example, pegs 502 may align the polarization-modification unit cell 500 with alignment holes on other radar components, such as waveguides or antennas (e.g., the horn antenna 404 illustrated in FIG. 4). In alternate embodiments, there may be more than two pegs 502, fewer than two pegs 502, or no pegs 502 at all.

Also analogous to the embodiment illustrated in FIG. 1, through-holes 504 can perform similar tasks to those performed by pegs 502 (e.g., connect and/or align the polarization-modification unit cell 500 with other components). For example, in some embodiments, through-holes 504 may be threaded, allowing through-holes 504 to be engaged by fasteners to connect the polarization-modification unit cell 500 to other radar components. As illustrated in FIG. 5, there are four through-holes 504. In alternate embodiments, there may be more than four through-holes 504, fewer than four through-holes 504, or no through-holes 504 at all.

The polarization-modification channel 506, in this embodiment, is the component of the polarization-modification unit cell 500 in which electromagnetic waves undergo a rotation of polarization. The thickness of the polarization-modification channel 506, and therefore, in some embodiments, the thickness of the main body of the polarization-modification unit cell 500, may be defined based on one or more wavelengths (or fractions of a wavelength) expected to undergo polarization-modification using the polarization-modification unit cell 500 (e.g., if the polarization-modification unit cell 500 is being used in radar applications that utilize 77 GHz electromagnetic waves, the thickness of the polarization-modification unit cell 500 could be around 3.9 mm, or about one wavelength).

An angle of the polarization-modification channel 506 relative to one or more mounting points (e.g., pegs 502 or through-holes 504) may define how much polarization-modification occurs when the polarization-modification unit cell 500 acts on an electromagnetic wave. Unlike the embodiment illustrated in FIG. 1, however, the polarization-modification channel 506 illustrated in FIG. 5 is rotated between 10 and 15 degrees relative to a line that is perpendicular to a line between the two pegs 502. Other angles are also possible in alternate embodiments. As stated above, smaller angles may increase the bandwidth of frequencies of incoming electromagnetic waves over which the polarization-modification channel 506 can effectively rotate polarization, especially when multiple polarization-modification unit cells 500 are cascaded.

In some embodiments, the polarization-modification channel 506 could be filled or partially filled with a material other than air. For example, a dielectric could be used to fill the polarization-modification channel 506 to alter a resonant wavelength inside of the polarization-modification channel 506, thereby altering an input wavelength range over which polarization rotation can occur using the polarization-modification unit cell 500.

Still further, in some alternate embodiments, the shape of the polarization-modification channel 506 could be changed. For example, the polarization-modification channel 506 could be circular or substantially circular, allowing for an alignment of the polarization-modification unit cell 500 with circular waveguides. In the embodiment illustrated in FIG. 5, the polarization-modification channel 506 has a shape of a rounded rectangle (i.e., the shape is substantially rectangular). Geometrically, such a shape can be defined as the shape obtained by taking the convex hull of four equal circles of a given radius and placing the centers of the four circles at the four corners of a rectangle having a first side length and a second side length.

Additionally or alternatively, some embodiments may influence two or more degenerate modes to form a single circularly polarized wave. In such embodiments, it may be possible for the unit cell to launch or radiate a circularly polarized wave upon receiving only linearly polarized waves as inputs. For example, this may occur in embodiments where the shape of the polarization-modification channel is an ellipse having low eccentricity, a trapezoid, or a rectangle having nearly equal side lengths.

Figure 6:
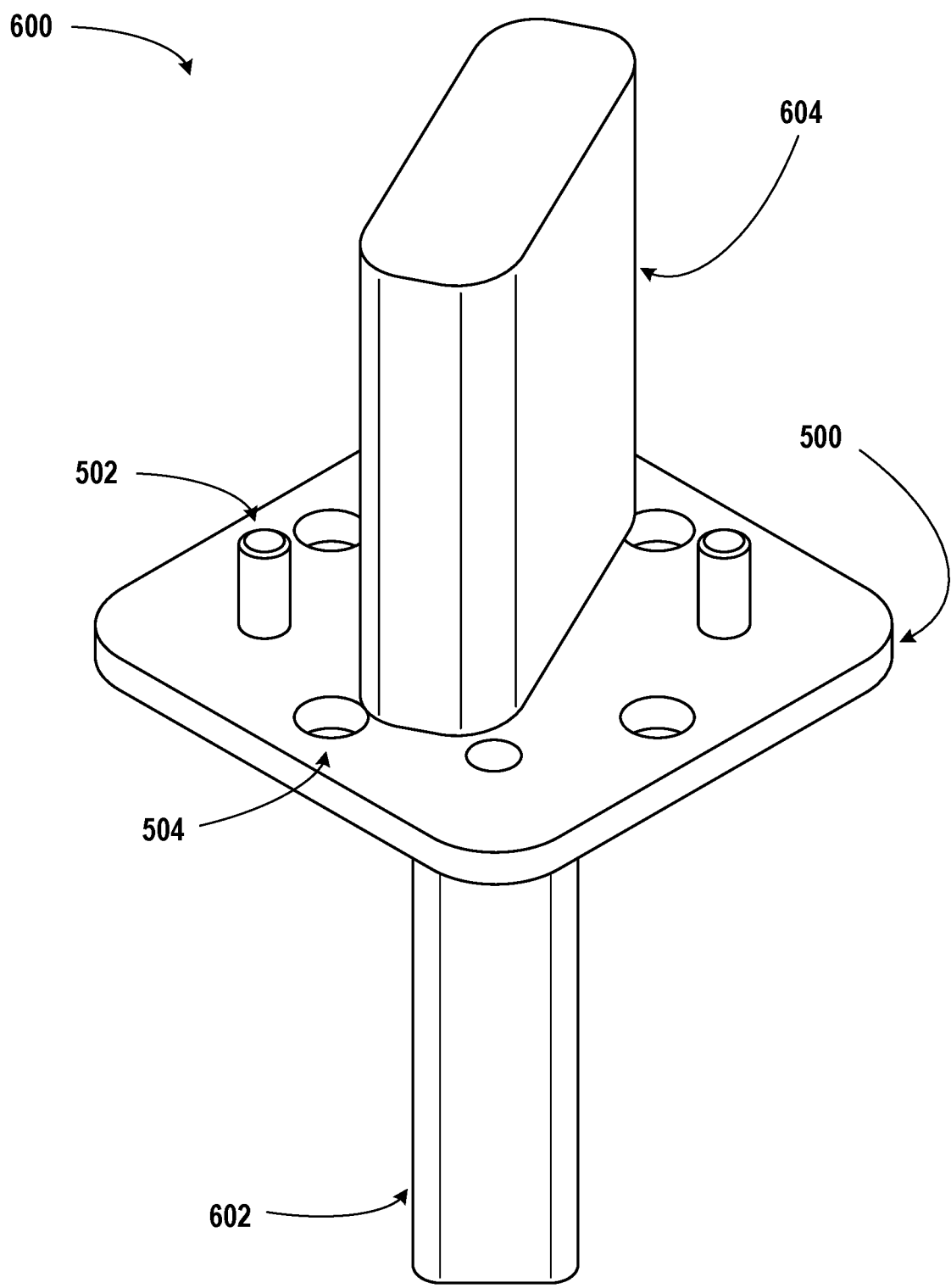
FIG. 6 illustrates a unit cell of another polarization filter and two waveguides, according to example embodiments.

FIG. 6 illustrates a unit cell of another polarization-modification 500 and two waveguides 602/604, according to example embodiments. As illustrated, the polarization-modification unit cell 500 may be the polarization-modification unit cell 500 illustrated in FIG. 5. In the embodiment of FIG. 6, the waveguides 602, 604 may respectively be referred to as the upper waveguide 604 and the lower waveguide 602. The polarization-modification unit cell 500, the lower waveguide 602, and the upper waveguide 604 can together comprise a system 600. As illustrated, the system 600 may be similar to the system 300 illustrated in FIG. 3. The primary difference, however, is the orientation of the upper waveguide 604 with respect to the polarization-modification unit cell 500 and the lower waveguide 602. As illustrated in FIG. 6, the upper waveguide 604 is angularly offset about a vertical axis from the lower waveguide 602 by roughly 30 degrees (as opposed to roughly 90 degrees, as illustrated in FIG. 3). As described above with regards to other systems and waveguides, the system 600 illustrated in FIG. 6 could be cascaded multiple times to achieve various other angles of polarization rotation (e.g., three instances of the system 600 could be cascaded to rotate polarization by roughly 90 degrees).

As described above, the system 600 can be configured to radiate electromagnetic waves that have polarization rotation of 30 degrees, for example, relative to an input polarization at the base of the lower rectangular waveguide 602. Such an arrangement could allow input electromagnetic waves (e.g., at a port on a side of the lower waveguide 602 opposite of polarization filter 100) to be rotated from one $TE_{10}$ polarization to another $TE_{10}$ polarization at the output (e.g., a port on a side of the upper waveguide 604 opposite of polarization filter 100), for example. Other angular rotations between input and output are also possible.

Alternatively, the system 600 could be used to receive electromagnetic waves of a given polarization at a port of the upper waveguide 604, and then rotate the polarization of the electromagnetic waves through an angle (e.g., an angle between 25 and 35 degrees) before emitting the electromagnetic waves having the rotated polarization out of a port in the base of the lower waveguide 602.

In some embodiments, the upper waveguide 604 may represent a waveguide output port of a radiating antenna, for example. Further, the lower waveguide 602 may represent a waveguide antenna element, connected to an electrical circuit or a feed waveguide within a radar system for example.

In the embodiment illustrated in FIG. 6, the upper waveguide 604 and the lower waveguide 602 may be of similar shapes and sizes, but rotated in orientation with respect to one another (e.g., at an angle between 25 and 35 degrees). Also, in addition to or alternatively to rotation with respect to one another about a vertical axis, one or both of the upper waveguide 604 and the lower waveguide 602 could be rotated with respect to an axis that lies parallel to a plane of the surface of the polarization-modification unit cell 500. In alternate embodiments, the upper waveguide 604 and the lower waveguide 602 may be different lengths, widths, heights, or shapes. Additionally, regardless of whether the upper waveguide 604 and the lower waveguide 602 are the same shape or size as one another, one or both of the upper waveguide 604 and the lower waveguide 602 could be circular, elliptical, or rectangular waveguides, as opposed to rounded rectangular waveguides. If the respective shapes of the upper waveguide 604 and the lower waveguide 602 are not equivalent, dimensions of the respective waveguides may be altered to accommodate the shape difference (e.g., if the lower waveguide 602 is a rounded rectangle and the upper waveguide 604 is a rectangle, the lower waveguide 602 may be slightly longer or wider to accommodate equivalent modes to those accommodated by the upper waveguide 604).

Figure 7:
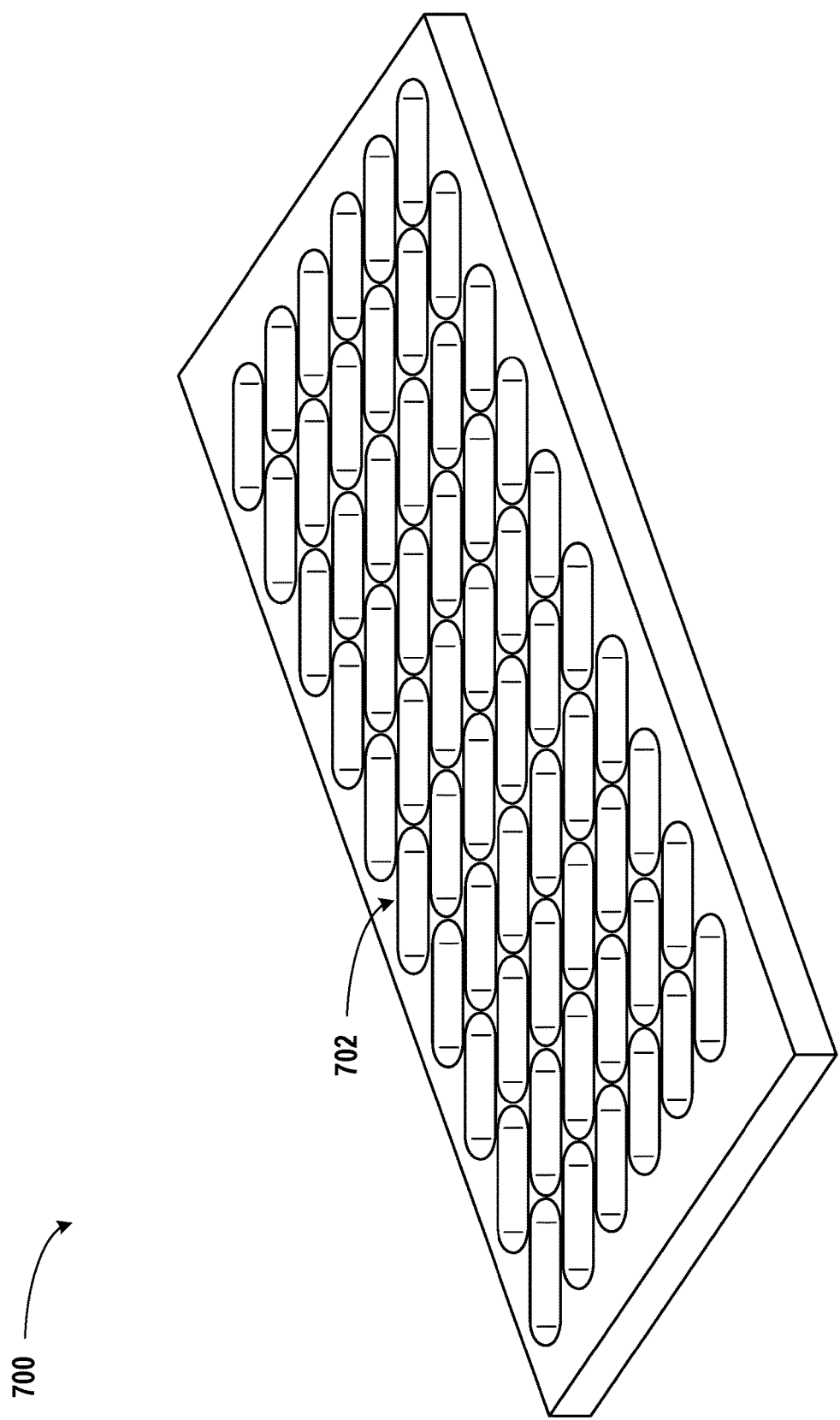
FIG. 7 illustrates a polarization filter layer, according to example embodiments.

FIG. 7 illustrates a polarization filter 700, according to example embodiments. The polarization filter 700 illustrated in FIG. 7 has multiple polarization-modification channels 702 defined therein. The polarization-modification channels 702 may form an array of polarization-modification channels. Each polarization-modification channels 702 may be similar to the polarization-modification channel 106 illustrated in FIG. 1. Further, the polarization filter 700 may be designed for used with an antenna (e.g., a radar antenna), such as the antenna 900 illustrated in FIG. 9.

As illustrated, the polarization-modification channels 702 may be defined in an array-like fashion within the polarization filter 700. The polarization-modification channels 702 may further be at an angle between 44 and 46 degrees (e.g., 45 degrees) relative to an orientation of the polarization filter 700, for example. Other angles are also possible. Further, while the embodiment illustrated in FIG. 7 depicts each of the polarization-modification channels 702 as having a similar orientation with respect to the polarization filter 700, this need not be the case. In additional embodiments, the polarization-modification channels 702 could be irregularly arranged or have different angles than one another. In some devices or systems, the polarization rotation that may occur using the polarization-modification layer 700 may not be isotropic for all regions within the device/system.

As illustrated in FIG. 7, the polarization-modification channels 702 have the shape of a stadium. Geometrically, a stadium (i.e., a disco-rectangle or another partially rounded shape) is defined as a rectangle with semicircles at a pair of opposite sides. However, the polarization-modification channels 702 may have various alternative shapes (e.g., an ellipse, a circle, a rounded rectangle, or a rectangle) or sizes (e.g., different radii, lengths, widths, etc.). Further, the polarization-modification channels 702 may not be the same size or shape as one another. As with the angle of rotation relative to the polarization-modification layer 700, the polarization-modification channels 702 may have varied shapes and sizes, perhaps spaced irregularly about the polarization-modification layer 700. Still further, the thickness of the polarization-modification layer 700 may vary among embodiments. For example, the thickness of the polarization-modification layer 700 may be between a half wavelength and a whole wavelength of the associated electromagnetic waves for which the polarization-modification layer 700 is designed (e.g., between 1.45 and 3.9 mm for a polarization-modification layer 700 designed to rotate polarization of incoming electromagnetic waves having an associated frequency of 77 GHz).

In some examples, the polarization-modification layer 700 may also include one or multiple resonant cavities. For instance, a resonant cavity may be located on a bottom side of the polarization-modification layer 700 and can function to match an impedance of the polarization-modification layer 700 to an impedance of the antenna to which the polarization-modification layer 700 is coupled.

Additionally or alternatively, the polarization-modification layer 700 could be used to select specific polarizations or frequencies through filtering. Such filtering considerations could also lead to variations in the shape, size, or filling material used within the polarization-modification channels 702. In other embodiments, the polarization-modification channels 702 may be designed to transmit, and possibly alter, electromagnetic waves having circular or elliptical polarization.

Figure 8A:
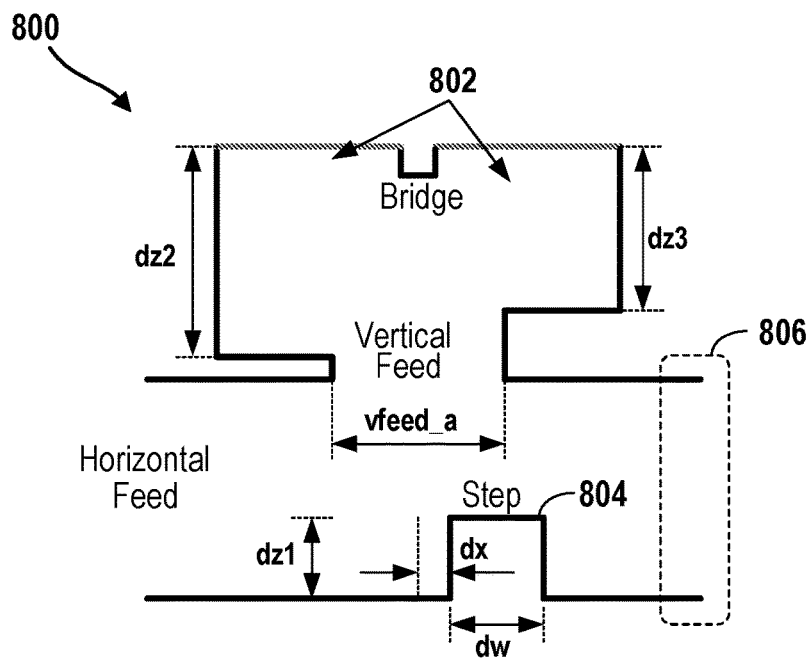
FIG. 8A illustrates a wave-radiating portion of an antenna, according to example embodiments.
Figure 8B:
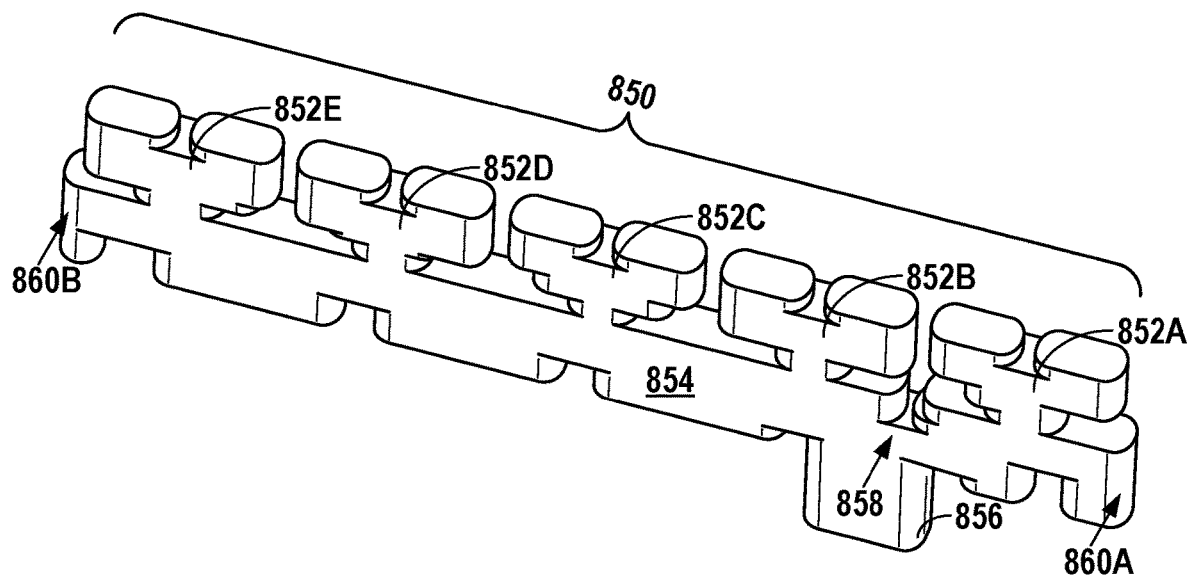
FIG. 8B illustrates another antenna, according to example embodiments.

FIG. 8A illustrates an example wave-radiating doublet of an example antenna, according to example embodiments. The example antenna could be used to radiate or receive radio waves, in example embodiments. More specifically, FIG. 8A illustrates a cross-section of an example DOEWG 800. The DOEWG 800 may include a horizontal feed (i.e., channel), a vertical feed (i.e., a doublet neck), and a wave-directing member 804. The vertical feed may be configured to couple energy from the horizontal feed to two output ports 802, each of which is configured to radiate at least a portion of electromagnetic waves out of the DOEWG 800. In some embodiments, the farthest DOEWG from the input port may include a backstop at location 806. DOEWGs that come before the last DOEWG may simply be open at location 806 and electromagnetic waves may propagate through that location 806 to subsequent DOEWGs. For example, a plurality of DOEWGs may be connected in series where the horizontal feed is common across the plurality of DOEWGs (as shown in FIG. 8B). FIG. 8A shows various parameters that may be adjusted to tune the amplitude and/or phase of an electromagnetic signal that couples into the radiating element.

In order to tune a DOEWG such as DOEWG 800, the vertical feed width, vfeed_a, and various dimensions of the step 804 (e.g., dw, dx, and dz1) may be tuned to achieve different fractions of radiated energy out the DOEWG 800. The step 804 may also be referred to as a reflecting component as it reflects a portion of the electromagnetic waves that propagate down the horizontal feed into the vertical feed. Further, in some examples, the height dz1 of the reflecting component may be negative. That is, the step 804 may extend below the bottom of the horizontal feed. Similar tuning mechanisms may be used to tune the offset feed as well. For example, the offset feed may include any of the vertical feed width, vfeed_a, and various dimensions of the step (e.g., dw, dx, and dz1) as discussed with respect to the radiating element.

In some examples, each output port 802 of the DOEWG 800 may have an associated phase and amplitude. In order to achieve the desired phase and amplitude for each output port 802, various geometrical components may be adjusted. As previously discussed, the step (reflecting component) 704 may direct a portion of the electromagnetic wave through the vertical feed. In order to adjust amplitude associated with each output port 802 of a respective DOEWG 800, a height associated with each output port 802 may be adjusted. Further, the height associated with each output port 802 could be the height or the depth of this feed section of output port 802.

As shown in FIG. 8A, height dz2 and height dz3 may be adjusted to control the amplitude with respect to the two output ports 802. In some embodiments, such as the embodiment of FIG. 9, the two output ports 802 (given reference numeral 902 in FIG. 9) may instead be referred to as waveguide antenna elements (e.g., the waveguide antenna elements 902 illustrated in FIG. 9) as they are shaped like and may function as waveguides and further may serve to radiate or receive electromagnetic waves. The adjustments to height dz2 and height dz3 may alter the physical dimensions of the doublet neck (e.g., vertical feed of FIG. 8A). The doublet neck may have dimensions based on the height dz2 and height dz3. Thus, as the height dz2 and height dz3 are altered for various doublets, the dimensions of the doublet neck (i.e., the height of at least one side of the doublet neck) may change. In one example, because height dz2 is greater than height dz3, the output port 802 associated with (i.e., located adjacent to) height dz2 may radiate with a greater amplitude than the amplitude of the signal radiated by the output port 802 associated with height dz3.

Further, in order to adjust the phase associated with each output port 802, a step may be introduced for each output port 802. The step in the height may cause a phase of a signal radiated by the output port 802 associated with the respective step to change. Thus, by controlling both the height and the respective step associated with each output port 802, both the amplitude and the phase of a signal transmitted by the output port 802 may be controlled. In various embodiments, the steps may take various forms, such as a combination of up-steps and down-steps. Additionally, the number of steps may be increased or decreased to control the phase.

The above-mentioned adjustments to the geometry may also be used to adjust a geometry of the offset feed where it connects to the waveguide. For example, heights, widths, and steps may be adjusted or added to the offset feed in order to adjust the radiation properties of the system. An impedance match, phase control, and/or amplitude control may be implemented by adjusting the geometry of the offset feed.

FIG. 8B illustrates an example offset feed waveguide portion 856 of an example antenna 850, according to example embodiments. As shown in FIG. 8B, a waveguide 854 may include a plurality of radiating elements (shown as 852A-852E) and an offset feed 856. Although the plurality of radiating elements is shown as doublets in FIG. 8B, other radiating structures may be use as well. For example, singlets, and any other radiating structure that can be coupled to a waveguide may be used as well.

The waveguide 854 may include various shapes and structures configured to direct electromagnetic power to the various radiating elements 852A-E of waveguide 854. A portion of electromagnetic waves propagating through waveguide 854 may be divided and directed by various recessed wave-directing member and raised wave-directing members. The pattern of wave-directing members shown in FIG. 8B is one example for the wave-directing members. Based on the specific implementation, the wave-directing members may have different sizes, shapes, and locations. Additionally, the waveguide may be designed to have the waveguide ends 860A and 860B to be tuned shorts. For example, the geometry of the ends of the waveguides may be adjusted so the waveguide ends 860A and 860B act as tuned shorts.

At each junction of one of the respective radiating elements 852A-E of waveguide 854, the junction may be considered a two-way power divider. A percentage of the electromagnetic power may couple into the neck of the respective radiating elements 852A-E and the remaining electromagnetic power may continue to propagate down the waveguide. By adjusting the various parameters (e.g., neck width, heights, and steps) of each respective radiating element 852A-E, the respective percentage of the electromagnetic power may be controlled. Thus, the geometry of each respective radiating element 852A-E may be controlled in order to achieve the desired power taper. Thus, by adjusting the geometry of each of the offset feed and each respective radiating element 852A-E, the desired power taper for a respective waveguide and its associated radiating elements may be achieved.

Electromagnetic energy may be injected into the waveguide 854 via the waveguide feed 856. The waveguide feed 856 may be a port (e.g., a through-hole) in a bottom metal layer, in some embodiments. An electromagnetic signal may be coupled from outside the antenna unit into the waveguide 854 through the waveguide feed 856. The electromagnetic signal may come from a component located outside the antenna unit, such as a printed circuit board, another waveguide, or other signal source. In some examples, the waveguide feed 856 may be coupled to another dividing network of waveguides (such as illustrated in FIGS. 9 and 10).

In some examples, the present system may operate in one of two modes. In the first mode, the system may receive electromagnetic energy from a source for transmission (i.e., the system may operate as a transmission antenna). In the second mode, the system may receive electromagnetic energy from outside of the system for processing (i.e., the system may operate as a reception antenna). In the first mode, the system may receive electromagnetic energy at a waveguide feed, divide the electromagnetic energy for transmission by a plurality of radiating elements, and radiate the divided electromagnetic energy by the radiating elements. In the second mode, the system may receive electromagnetic energy at the plurality of radiating elements, combine the received electromagnetic energy, and couple the combined electromagnetic energy out of system for further processing.

It should be understood that other shapes and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience.

Figure 9:
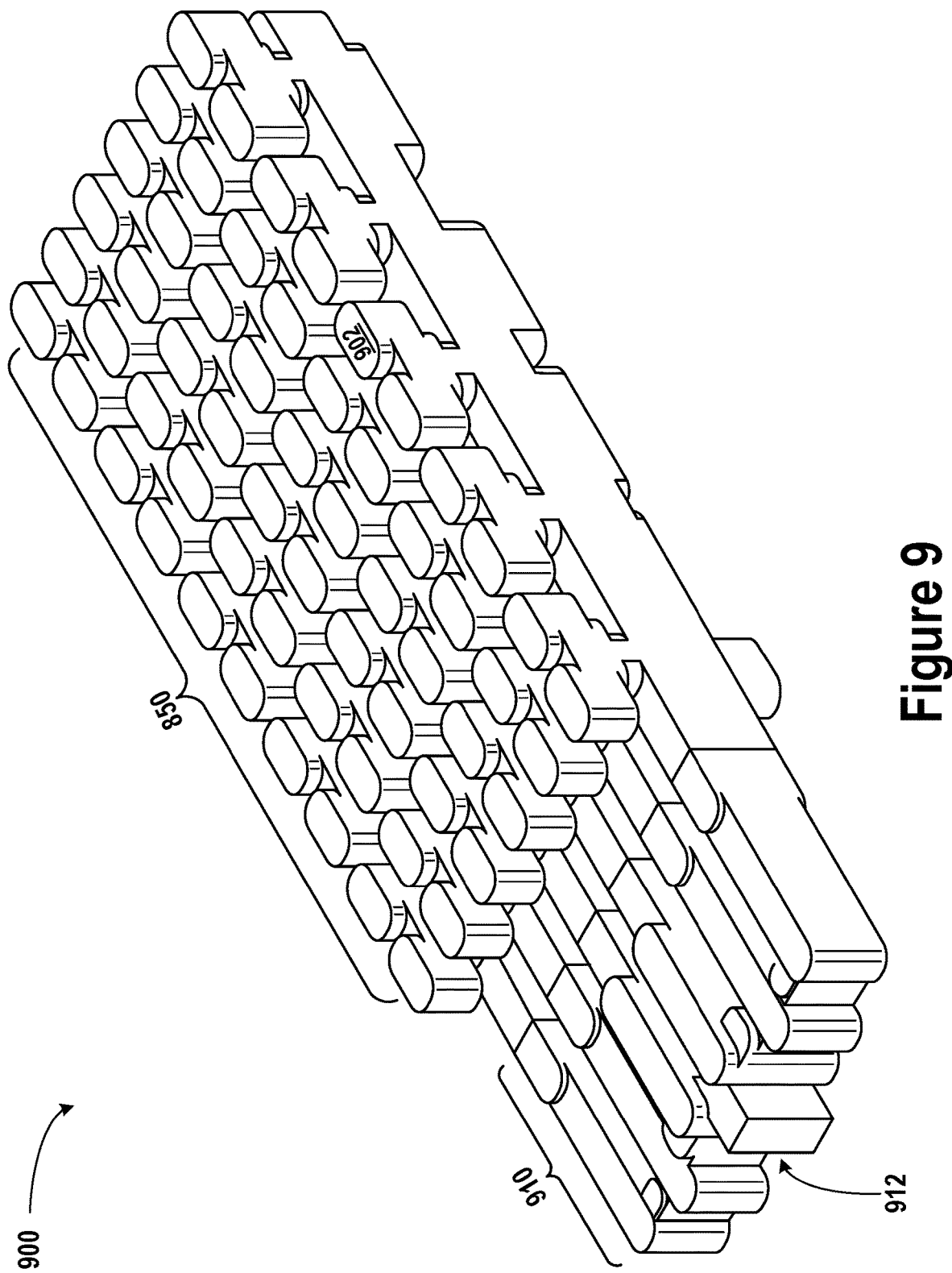
FIG. 9 illustrates an array of open ended waveguide antenna elements, according to example embodiments.
Figure 10:
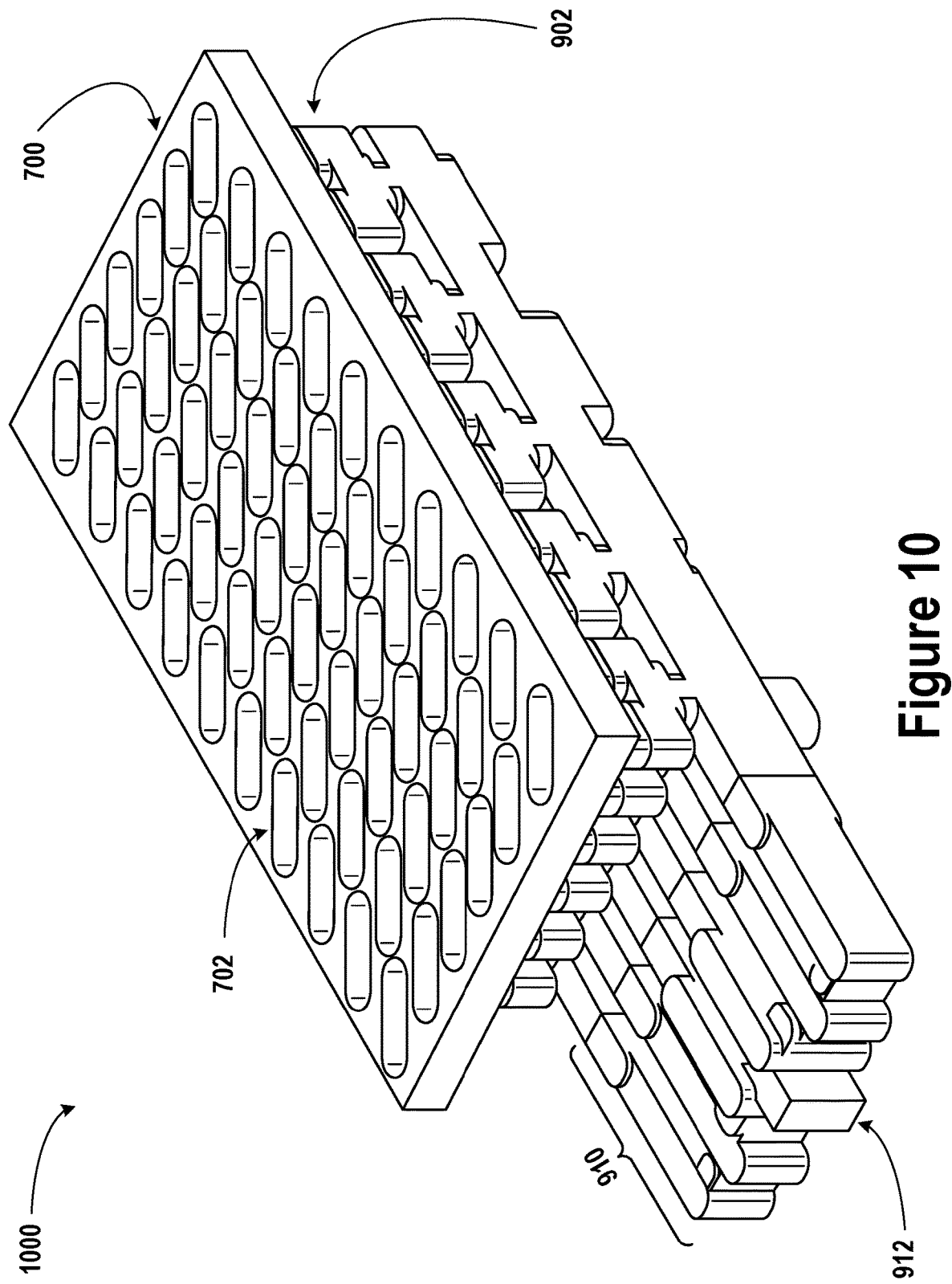
FIG. 10 illustrates another array of open ended waveguide antenna elements and a polarization filter, according to example embodiments.

FIG. 9 illustrates an array of waveguide antenna elements 902, according to example embodiments. The size and shape of the waveguide antenna elements 902, as well as the corresponding feed waveguides illustrated in FIG. 9, may correspond to a given electromagnetic frequency (e.g., 77 GHz) and/or polarization (e.g., horizontal $TE_{10}$ polarization) for which the array of waveguide antenna elements 902 is designed to operate. Along with other components pictured, the waveguide antenna elements 902 may be part of an antenna system 900. The waveguide antenna elements 902 may be arranged in an array, as illustrated in FIG. 9. Further, the array of waveguide antenna elements 902 may be arranged in a group of individual antennas 850 as illustrated in FIG. 8. Specifically, the embodiment illustrated in FIG. 9 includes six instances of the antenna 850 illustrated in FIG. 8, resulting in a 6×10 array of waveguide antenna elements 902. Other numbers of waveguide antenna elements 902 and/or antennas 850 are also possible. The antenna system 900 may be on a transmit end and/or a receive end of a radar or radio communication system, for example. Further, two instances of the antenna system 900 can be used in conjunction with one another to form a transmit/receive system (e.g., a radio communication system). Still further, the antenna system 900 may be designed to radiate and/or receive electromagnetic waves in a $TE_{10}$ waveguide mode.

In addition to the waveguide antenna elements 902 arranged in a group of antennas 850 illustrated in FIG. 9, the antenna system 900 may additionally include a phase adjusting section 910 and a waveguide input 912. The waveguide input 912 may be connected to an electromagnetic source (e.g., a radar source), in some embodiments. The phase adjusting section 910 may adjust a phase associated with electromagnetic waves input into the waveguide input 912, for example. This could allow proper phase to be distributed to each of the waveguide antenna elements 902 when transmitting a signal. Further, the phase adjusting section 910 may be configured to divide power of an incoming electromagnetic wave among multiple feed waveguides associated with multiple instances of the antenna 850.

In some embodiments, as described above, antenna system 900 may include a series of independent antennas 850 that are connected to a common waveguide input 912. Instead of being independent antennas 850, the antennas 850 may function as a single antenna unit, as illustrated in FIG. 9. Whether the antenna system 900 describes independent antennas or a single antenna unit, the waveguide antenna elements 902 can serve to radiate electromagnetic waves and/or receive electromagnetic waves. The electromagnetic waves radiated and/or received may be transmitted down the horizontal and vertical feeds of the corresponding waveguides, as described with regard to FIG. 8.

FIG. 10 illustrates an array of waveguide antenna elements 902 and a polarization-modification layer 700, according to example embodiments. In some embodiments, the array of waveguide antenna elements 902 may be designed according to an industry standard (e.g., an automotive industry standard) and the polarization-modification layer 700 may be designed in such a way as to accommodate that industry standard. Alternatively, the array of waveguide antenna elements 902 and the corresponding polarization-modification layer 700 could be designed for one or more specific applications. Collectively, the array of waveguide antenna elements 902 and the polarization-modification layer 700 may comprise an antenna 1000. In some embodiments, as in the embodiment illustrated in FIG. 10, the antenna 1000 may additionally include the phase adjusting section 910 and/or the waveguide input 912 illustrated in FIG. 9. In the example embodiment of FIG. 10, the thickness of the polarization-modification layer 700 could be less than a wavelength thick (e.g., between a quarter wavelength and a whole wavelength) of the electromagnetic waves which the antenna 1000 was designed to transmit or receive. Other thicknesses are also possible. Further, the antenna 1000 may be designed to radiate or receive electromagnetic waves in a $TE_{10}$ waveguide mode.

In the embodiment illustrated in FIG. 10, the polarization-modification channels 702 defined within the polarization-modification layer 700 may serve to rotate polarization emitted by the waveguide antenna elements 902. Thus, the electromagnetic waves radiated by the antenna 1000 may be of a polarization that is rotated with respect to a polarization that is output by the waveguide antenna elements 902. Additionally or alternatively (e.g., if the antenna 1000 is acting as a receiver within a radar system or radio communication system), the polarization-modification channels 702 defined within the polarization-modification layer 700 may serve to rotate a polarization associated with a received electromagnetic wave prior to transmitting the electromagnetic wave to the waveguide antenna elements 902.

As previously discussed with respect to FIG. 7, the polarization-modification layer 700 may also include a resonant cavity as part of each of the polarization-modification channels 702. The resonant cavity may be configured to perform impedance matching between each waveguide antenna elements 902 and the respective one of the polarization-modification channels 702 coupled to the waveguide antenna elements 902. In some radar systems, for example, a transmitter may be configured like the antenna 1000 illustrated in FIG. 10. Such a transmitter may communicate with a receiver, also configured like the antenna 1000 illustrated in FIG. 10.

As illustrated in FIG. 10, in either of the above described cases (i.e., whether the antenna 1000 is acting as a transmitter or a receiver), the polarization radiated by or accepted by the polarization-modification channels 702 is at an angle with respect to the waveguide antenna elements 902. This corresponding angle may be between 44 and 46 degrees (e.g., 45 degrees), for example. A variety of alternate angles may also be used in various embodiments. In still other embodiments, the polarization-modification channels 702 need not all be disposed at the same angle relative to waveguide antenna elements 902. This could allow a corresponding antenna to radiate and receive electromagnetic waves having a variety of polarizations, for example. In yet other embodiments, the polarization-modification channels 702 need not be all the same size and shape as one another. This could allow a corresponding antenna to radiate and receive electromagnetic waves having a variety of polarizations (e.g., if the polarization-modification channels 702 were circular rather than stadium-shaped) and/or a variety of frequencies (e.g., if the polarization-modification channels 702 were sized such that they were resonant at different frequencies), for example. Even further, one or more of the polarization-modification channels 702 could be filled with a material (e.g., a dielectric material), thereby further changing one or more of the properties (e.g., resonant frequency) of the associated electromagnetic waves which could propagate through the corresponding polarization-modification channel 702.

In some embodiments, two or more polarization-modification layers 700 could be cascaded on top of the waveguide antenna elements 902. If there were multiple polarization-modification layers 700 cascaded on top of the waveguide antenna elements 902, the corresponding polarization-modification channels 702 could provide increased frequency bandwidth over which electromagnetic waves could be radiated or received by the corresponding antenna. Further, cascading multiple polarization-modification layers 700 could permit an angle of polarization radiated or received to be greater or less than the angle illustrated in FIG. 10. For example, an alternate antenna may have two cascaded polarization-modification layers. The first layer could be at an angle between 20 and 25 degrees with respect to the array of waveguide antenna elements 902, and the second layer could be at an between 20 and 25 degrees with respect to the first layer. In this way, the angle of polarization rotation undergone by electromagnetic waves (i.e., 45 degrees) would be the same as in the embodiment of FIG. 11, but the bandwidth could be increased.

The design of the antenna 1000 illustrated in FIG. 10 could also serve to reduce interference between two separate antennas. For example, a radar system could employ two antennas having analogous designs, but the polarization-modification channels within the polarization-modification layer of one antenna are rotated at an angle that is orthogonal to the polarization-modification channels within the polarization-modification layer of the other antenna. In an alternative example, two separate antennas could have polarization-modification layers with polarization-modification channels oriented at a parallel angle with one another, but be facing one another (e.g., if the antennas were mounted in the same orientation on vehicles travelling in opposite directions). Either of the above methods could reduce interference because the two antennas employ orthogonal polarizations. Therefore, cross polarization isolation may occur between the two antennas. For example, a signal output by one antenna may be attenuated by as much as 40 dB (decibels) when transmitted through the polarization-modification layer of the other antenna.

Figure 11:
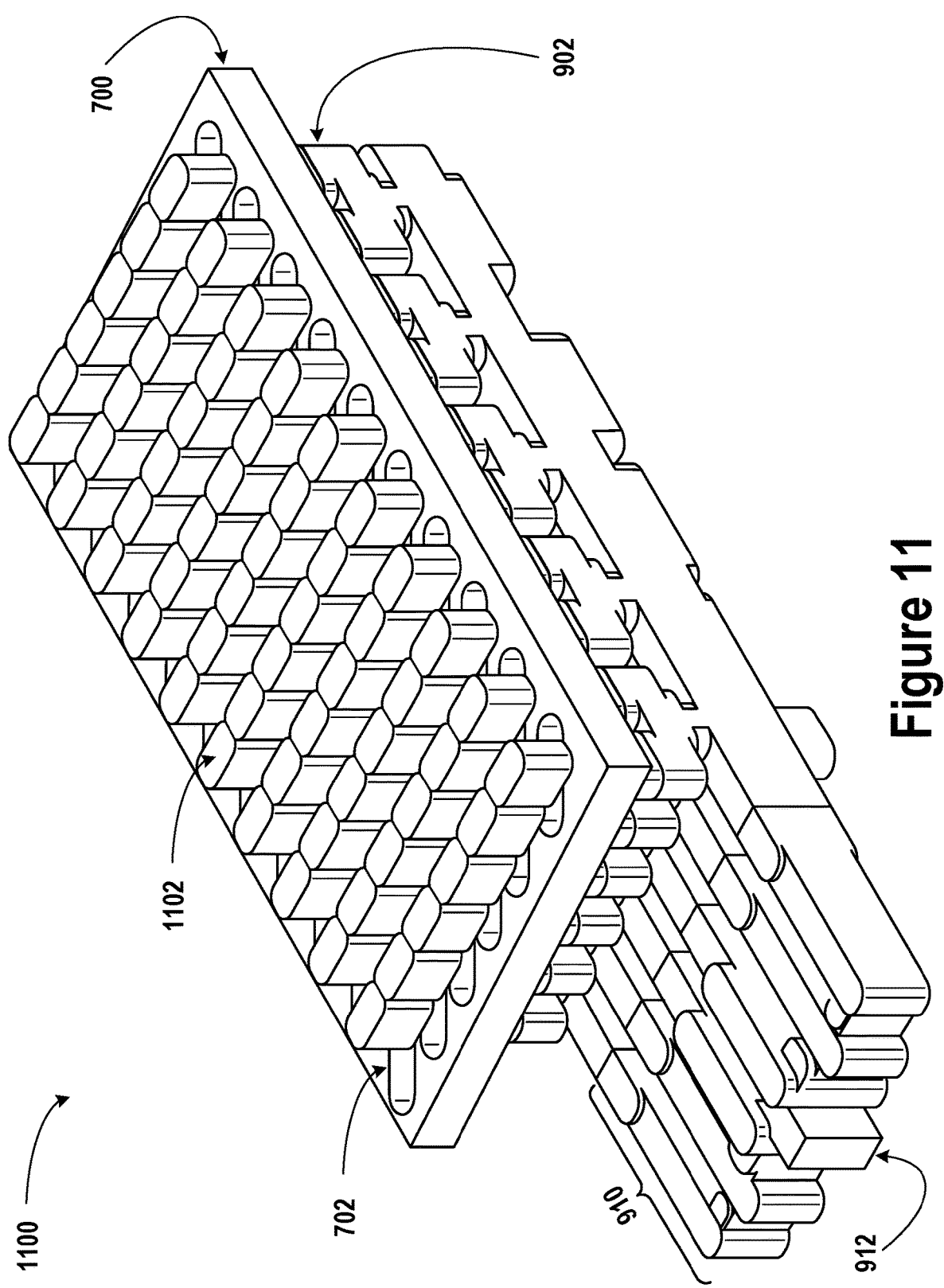
FIG. 11 illustrates an array of waveguide antenna elements, a polarization filter, and an array of waveguide output ports, according to example embodiments.

FIG. 11 illustrates an array of waveguide antenna elements 902, a polarization-modification layer 700, and an array of waveguide output ports 1102, according to example embodiments. As illustrated, the embodiment illustrated in FIG. 11 may be analogous to the embodiment illustrated in FIG. 10 with an addition of an array of waveguide output ports 1102. The array of waveguide antenna elements 902, the polarization-modification layer 700, and the array of waveguide output ports 1102, in addition to the phase adjusting section 910 and the waveguide input 912 may form an antenna 1100. Further, the antenna 1100 may be designed to radiate or receive electromagnetic waves in a $TE_{10}$ waveguide mode.

The antenna 1100 could be used to transmit and/or receive electromagnetic waves (e.g., radio waves) for a variety of purposes (e.g., navigation within an autonomous vehicle using radar or radio communication). In further embodiments, the antenna 1100 may have a greater or lesser number of waveguide antenna elements 902, waveguide output ports 1102, and/or polarization-modification channels 702. Additionally or alternatively, the antenna 1100 may not have the phase adjusting section 910 or the waveguide input 912. For example, one or more of the individual waveguide antenna elements 902 may be fed by photonic or electronic source(s) rather than feed waveguides connected to the phase adjusting section 910 and the waveguide input 912.

In the embodiment of FIG. 11, the waveguide antenna elements 902 could output electromagnetic waves, for example. These electromagnetic waves may then propagate to the polarization-modification channels 702. The polarization-modification channels 702 may then serve to rotate the polarization of the associated electromagnetic waves by a defined angle (e.g., 45 degrees). The electromagnetic waves, now having an intermediate polarization, may then be transmitted to the waveguide output ports 1102. The waveguide output ports 1102 may be designed of sufficient length so as to assure that any evanescent waves, which are transmitted from the polarization-modification channels 702 to the waveguide output ports 1102, are sufficiently attenuated before reaching radiation ports located at an end of the waveguide output ports 1102. Upon entering the waveguide output ports 1102, the electromagnetic waves may undergo another polarization rotation (e.g., by an additional 45 degrees). The associated electromagnetic waves, now having a polarization rotated by a given angle relative to the waveguide antenna elements 902 (e.g., a polarization rotated by 45 or 90 degrees; the input polarization thus being orthogonal to the output polarization) may then be radiated to the environment upon exiting the waveguide output ports 1102. This process could also occur in the pseudo-inverse to receive electromagnetic waves using the same antenna 1100 (i.e., electromagnetic waves are received by the waveguide output ports 1102, the polarization is rotated upon entering the polarization-modification channels 702, the polarization is rotated again upon entering the waveguide antenna elements 902, and then the electromagnetic waves are transmitted to one or more devices attached to the antenna having been rotated in polarization twice).

In some embodiments, as illustrated in FIG. 11, the number of waveguide antenna elements 902 within the array, the number of polarization-modification channels 702 defined within the polarization-modification layer 700, and the number of waveguide output ports 1102 within the array will all be the same. In some embodiments, there may be greater or fewer waveguide output ports 1102 than polarization-modification channels 702, which may in turn be greater or fewer than the number of waveguide antenna elements 902. Further, the arrangement of the array of waveguide output ports 1102 may not correspond to the arrangement of the polarization-modification channels 702, as illustrated in FIG. 11. In some embodiments, for example, the array of waveguide output ports 1102 may be spaced irregularly or differently from the spacing of the polarization-modification channels 702.

As illustrated in FIG. 11, each of the waveguide output ports 1102 is rotated the same amount with respect to the underlying polarization-modification channel 702 (e.g., between 44 and 46 degrees). Further, each of the polarization-modification channels 702 is rotated the same amount with respect to the underlying waveguide antenna element 902 (e.g., between 44 and 46 degrees). As such, in the antenna 1100 of FIG. 11, each of the waveguide output ports 1102 is rotated an equal amount with respect to the underlying waveguide antenna elements 902 (e.g., between 88 and 92 degrees). Other angles besides those illustrated in FIG. 11 are also possible. For example, the angle between the polarization-modification channels 702 and the waveguide antenna elements 902 could be 15 degrees, and the angle between the polarization-modification channels 702 and the waveguide output ports 1102 could be 15 degrees, resulting in an angle between the waveguide output ports 1102 and the waveguide antenna elements 902 of 30 degrees.

In some embodiments, the rotation of the waveguide output ports 1102 relative to the polarization-modification channels 702 and/or the waveguide antenna elements 902 may vary among the waveguide output ports (e.g., one waveguide output port is rotated 75 degrees with respect to the underlying waveguide antenna element and another is rotated 90 degrees with respect to the underlying waveguide antenna element). Such a variation could leave to multiple polarization angles being emitted by the antenna 1100, for example. Further, such a variation in angles could cause the corresponding arrangement of waveguide output ports within the array or the corresponding size/shape of various waveguide output ports to change to accommodate such differences.

Additionally, as described above, one or more of the waveguide guide output ports 1102 could additionally or alternatively be rotated about an axis parallel to the planar surface of the polarization-modification layer 700 (as opposed to rotated about the vertical axis that is normal to the planar surface of the polarization-modification layer 700). This could allow for directionality of the antenna 1100, for example.

As illustrated in FIG. 11, the waveguide output ports 1102 are shaped as rounded rectangles. Further, dimensions associated with the output ports 1102 illustrated in FIG. 11 may correspond to specific wavelengths of electromagnetic waves that are to be transmitted and/or received by the antenna 1100 (e.g., wavelengths associated with electromagnetic waves having a frequency of 77 GHz). However, one or more of the waveguide output ports 1102 could be replaced by alternately shaped and/or sized output ports (e.g., a horn antenna or a substantially circular waveguide). Still further, the waveguide output ports 1102 may additionally or alternatively be wholly or partially filled with a material other than air (e.g., a dielectric material). Any of these factors (e.g., shape, size, or filling of the waveguide output ports 1102), as well as other factors, could enhance or reduce filtering characteristics associated with the antenna 1100. For example, if one or more of the waveguide output ports 1102 were filled with a dielectric, the resonant wavelength associated with the respective waveguide output port(s) 1102 may be altered, thus enhancing or diminishing the transmission of specific wavelengths through the respective waveguide output port(s) 1102.

Described above analogously, multiple layers of waveguide output port 1102 arrays could be cascaded. This could increase the bandwidth of frequencies which could effectively be used with the antenna 1102, for example. Further, such a cascading could increase or decrease an angle between the waveguide output ports 1102 and the waveguide antenna elements 902. Additionally or alternatively, alternating layers of polarization-modification layers 700 followed by waveguide output port 1102 array layers could be cascaded to achieve similar effects. For example, an alternate antenna design may include an array of waveguide antenna elements, followed by two polarization-modification layers, followed by an array of waveguide output ports. In such a design, there could be an angle between each successive layer performing additional polarization rotation (e.g., the polarization-modification channels in the first polarization-modification layer are at an angle, e.g. 25 to 35 degrees, with respect to the array of waveguide antenna elements, the polarization-modification channels within the second polarization-modification layer are at another angle, e.g. 25 to 35 degrees, with respect to the polarization-modification channels in the first polarization-modification layer, and the array of waveguide output ports are at yet another angle, e.g. 25 to 35 degrees, with respect to the polarization-modification channels in the second polarization-modification layer). In addition, the angles, sizes, shapes, distributions, or numbers of waveguide output ports 1102 and/or polarization-modification channels 702 within such cascaded layers may vary from layer to layer.

Figure 13:
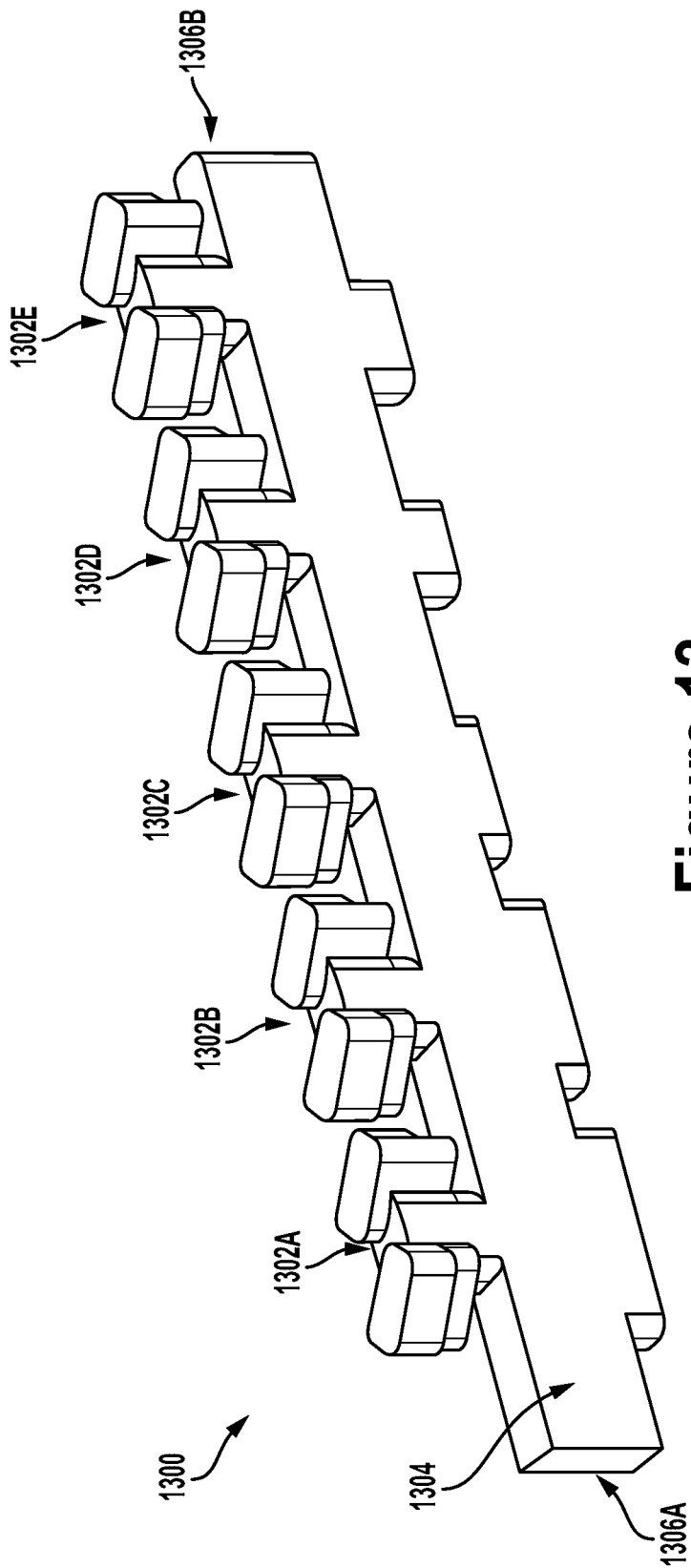
FIG. 13 illustrates a twisted antenna, according to example embodiments.

FIGS. 12-13 show further configurations of antennas having a polarization rotation integrated in the throat of the DOEW that can provide desired power division ratios, an impedance match for all (or a subset) of ports using one or multiple steps, ridges, or a combination. The example antennas shown can provide the desired twisted polarization of electromagnetic waves while also having the ability to maintain a compact size and location overall. In some instances, the antennas shown in FIG. 12-13 may include a rotation portion that is integrated into a top portion of the antenna block. Thus, unlike the previous description, the polarization twist may be achieved within the split-block antenna structure, therefore a polarization filter may not be used to achieve the polarization rotation.

FIG. 12A illustrates example twisted antenna configuration 1200. As shown, antenna configuration 1200 includes radiating elements 1202, 1204, 1206, and 1208 that each may transmit or receive radar signals as part of a radar unit. The configuration of radiating elements 1202-1208 can adjust the polarization at which each radiating element 1202-1208 transmits or receives radar signals. For example, the inner configuration 1200 may be configured to twist the polarization of radar signals transmitted or received by ninety (90) degrees.

In some examples, the twisted configuration of radiating elements 1202-1208 relative to the waveguide of antenna configuration 1200 may adjust the polarization of electromagnetic waves transmitted or received by forty-five degrees. For instance, radiating elements 1202-1208 may cause radar signals to be transmitted at a slanted, forty-five degrees from horizontal polarization instead of a vertical linear polarization. In other examples, radiating elements 1202-1208 can adjust polarization of radar signals to a greater or lesser extent. As an example, the configuration of radiating elements 1202-1208 may adjust the polarization by ninety-degrees (e.g., from horizontal linear polarization to vertical linear polarization). In further examples, the extent of polarization modification can differ among the set of radiating elements 1202-1208.

FIG. 12B illustrates another twisted antenna configuration 1210. As shown, antenna configuration 1210 includes twisted radiating elements 1212, 1214, 1216, 1218, 1220, and 1222. In other examples, the configuration, quantity or radiating elements, and other parameters of antenna configuration 1210 can differ.

Radiating elements 1212-1222 connect to an inner serial feeding waveguide of antenna configuration 1210 in a manner that adjusts the performance of antenna configuration 1210. In, particular, the twisted configuration can modify operation of radiating elements 1212-1222 such that each radiating element operates in a different polarization as desired. For example, radiating elements 1212-1222 may transmit or receive radar signals in a slanted polarization (e.g., a slanted polarization at positive or negative forty-five degrees from horizontal). In other examples, the extent of modification of polarization of radar signals can vary depending on the configuration of radiating elements 1212-1222. For instance, radiating elements 1212-1222 may alter the polarization of electromagnetic waves by ninety degrees (90 degrees) depending on the configuration of radiating elements 1212-1222 relative to the waveguide of antenna configuration 1210. Further, the type of feed (e.g., parallel, serial) directing electromagnetic waves into the waveguide can differ within examples.

FIG. 13 illustrates a twisted antenna 1300. As shown in FIG. 13, waveguide 1304 may include multiple radiating elements (shown as 1302A-1302E). Although radiating elements 1302A-1302E are shown as doublets, other radiating structures may be use as well. For example, singlets, and any other radiating structure that can be coupled to a waveguide may be in other example implementations.

Waveguide 1304 may include various shapes and structures configured to direct electromagnetic power to the various radiating elements 1302A-1302E coupled to waveguide 1304. A portion of electromagnetic waves propagating through waveguide 1304 may be divided and directed by various recessed wave-directing member and raised wave-directing members. The pattern of wave-directing members shown in FIG. 13 is one example for the wave-directing members. Based on the specific implementation, the wave-directing members may have different sizes, shapes, and locations.

At each junction of one of the respective radiating elements 1302A-1302E of waveguide 1304, the junction may be considered a two-way power divider. As such, a percentage of the electromagnetic power may couple into the neck of the respective radiating elements 1302A-1302E and the remaining electromagnetic power may continue to propagate down waveguide 1304. By adjusting various parameters (e.g., neck width, heights, and steps) of each respective radiating element 1302A-1302E, the respective percentage of the electromagnetic power may be controlled while an impedance match is maintained in all affected ports associated with the power divider. Thus, the geometry of each respective radiating element 1302A-1302E may be controlled in order to achieve the desired power taper. The adjustments of the geometry of each of the offset feed and each respective radiating element 1302A-1302E can cause the desired power taper for waveguide 1304 and associated radiating elements 1302A-1302E may be achieved.

Electromagnetic energy may be injected into the waveguide 1304 via a waveguide feed. For instance, the waveguide feed may be a port (e.g., a through-hole) in a bottom metal layer, in some embodiments. An electromagnetic signal may be coupled from outside the antenna unit into waveguide 1304 through the waveguide feed. The electromagnetic signal may come from a component located outside the antenna unit, such as a printed circuit board, another waveguide, or other signal source. In some examples, the waveguide feed may be coupled to another dividing network of waveguides.

In some examples, the present system may operate in one of two modes. In the first mode, the system may receive electromagnetic energy from a source for transmission (i.e., the system may operate as a transmission antenna). In the second mode, the system may receive electromagnetic energy from outside of the system for processing (i.e., the system may operate as a reception antenna). In the first mode, the system may receive electromagnetic energy at a waveguide feed, divide the electromagnetic energy for transmission by a plurality of radiating elements, and radiate the divided electromagnetic energy by the radiating elements. In the second mode, the system may receive electromagnetic energy at the plurality of radiating elements, combine the received electromagnetic energy, and couple the combined electromagnetic energy out of system for further processing.

As further shown in FIG. 13, radiating elements 1302A-1302E are each shown in a rotated position. Particularly, the rotation can adjusts the performance of each radiating element causing radiating elements 1302A-1302E to operate in a different polarization as desired. For example, the twisted configuration of radiating elements 1302A-1302E can cause radiating elements 1302A-1302E to receive the divided and pre-twisted electromagnetic waves from the neck and subsequently adjust the polarization of the electromagnetic waves to a desired polarization (e.g., slanted forty-five degrees from horizontal). The configuration between waveguide 1304 and radiating elements 1302A-1302E includes sufficient propagation paths that can stabilize the electromagnetic waves. The stabilization of the electromagnetic waves can also diminish or even eliminate parasitic evanescent waves associated with twisted antenna 1300. As a result of the configuration and propagation paths of twisted antenna 1300, only desired propagating electromagnetic waves may survive in the desired twisted angle.

Additionally, waveguide 1304 may be designed to have waveguide ends 1306A and 1306B to be tuned shorts. For example, the geometry of the ends of the waveguides may be adjusted so waveguide ends 1306A and 1306B act as tuned shorts. In some implementations, waveguide ends 1306A, 1306B or other components can provide an impedance match to free space at the end of waveguide 1304. As such, twisted antenna 1300 may radiate the electromagnetic waves into free space with no reflection.

It should be understood that other shapes, configurations, and dimensions of the waveguide channels, portions of the waveguide channels, sides of the waveguide channels, wave-directing members, and the like are possible as well. In some embodiments, a rectangular shape of waveguide channels may be highly convenient to manufacture, though other methods known or not yet known may be implemented to manufacture waveguide channels with equal or even greater convenience. In further examples, radiating elements 1302A-1302E may have a different configuration relative to waveguide 1304 such that radiating elements 1302A-1302E transmit or receive radar signals at different polarizations as desired.

In addition, some examples can include a subset of radiating elements 1302A-1302E to have different configurations such that the subset operates in a different polarization compared to other radiating elements of twisted antenna 1300. For instance, radiating elements 1302A, 1302B, and 1302C may be configured to operate in a first polarization and radiating elements 1302D, 1302E may be configured to operate in a second polarization that differs from the first polarization. Antenna 1300 may be part of a radar system that operates in one or multiple polarizations to reduce potential jamming with radar from other systems. Further, the configuration of antenna 1300 can enhance the signal-to-noise ratio (SNR) reducing unwanted noise while antenna 1300 operates.

Figure 14:
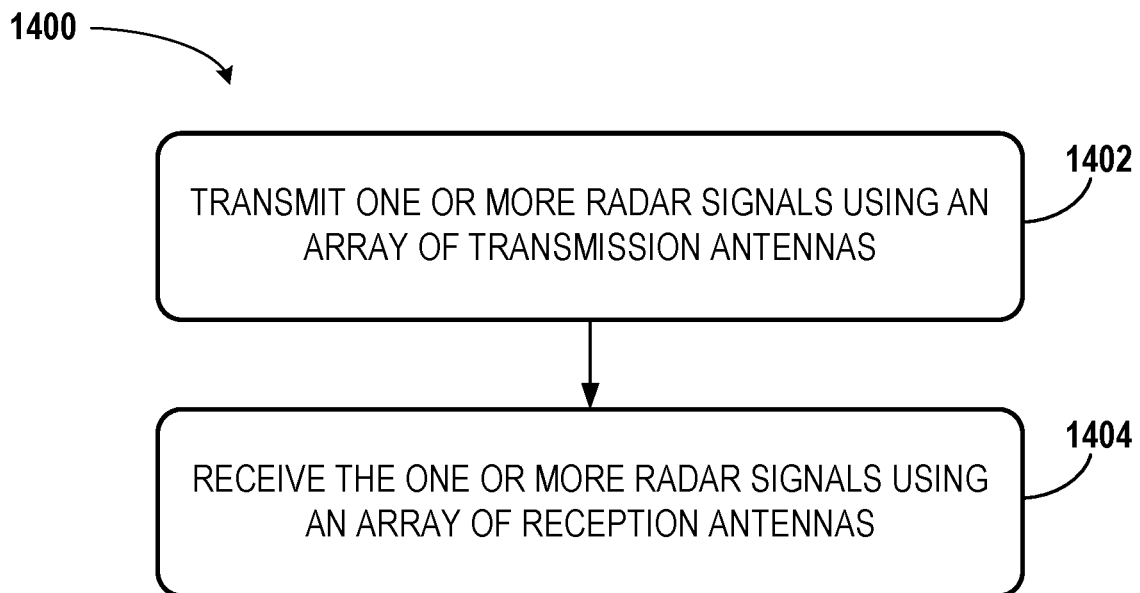
FIG. 14 illustrates a method of radiating electromagnetic waves, according to example embodiments.

FIG. 14 illustrates a method 1400 of radiating electromagnetic waves, according to example embodiments. The method 1400 may be performed using the antenna 1100 illustrated in FIG. 11, in some example embodiments. Further, the method 1400 could be performed pseudo-inversely to receive electromagnetic waves (as opposed to radiate), in some embodiments. The method 1400 may be performed to aid in navigation of an autonomous vehicle using a radar system mounted on the autonomous vehicle, for example. Alternatively, the method 1400 may be performed to communicate using radio communication techniques.

At block 1402, the method 1400 includes emitting electromagnetic waves having a first polarization from a plurality of waveguide antenna elements in a first array. The waveguide antenna elements in the first array may resemble the array of waveguide antenna elements 902 illustrated in FIG. 9, for example. As an example, a radar unit coupled to a portion (or built into a portion) of a vehicle may emit electromagnetic waves.

At block 1404, the method 1400 includes receiving, by channels defined within a polarization-modification layer that is disposed between the waveguide antenna elements and a plurality of waveguide output ports arranged in a second array, the electromagnetic waves having the first polarization. The channels may be oriented at a first angle with respect to the waveguide antenna elements. The first angle may be between 44 and 46 degrees (e.g., 45 degrees), for example. Further, the polarization-modification layer and the channels may be the polarization-modification layer 700 and the polarization rotating channels 702, respectively, illustrated in FIG. 7, for example. Still further, the waveguide output ports may be the waveguide output ports 1102 illustrated in FIG. 11, for example.

At block 1406, the method 1400 includes transmitting, by the channels defined within the polarization-modification layer, electromagnetic waves having an intermediate polarization.

At block 1408, the method 1400 includes receiving, by the waveguide output ports, electromagnetic waves having the intermediate polarization. The waveguide output ports may be oriented at a second angle with respect to the channels. The second angle may be between 44 and 46 degrees (e.g., 45 degrees), for example.

At block 1410, the method 1400 includes radiating, by the waveguide output ports, electromagnetic waves having a second polarization. The second polarization may be different from the first polarization. The second polarization may also be different from the intermediate polarization. Further, the first polarization may be different from the intermediate polarization. The first polarization, intermediate polarization, and second polarization could be the following, respectively: a horizontal $TE_{10}$ polarization, a $TE_{10}$ polarization at a 45-degree angle between horizontal and vertical, and a vertical $TE_{10}$ polarization.

It should be understood that other shapes and dimensions of the waveguide channels, portions of the waveguide channels, sides of the waveguide channels, wave-directing members, and the like are possible as well. In some embodiments, a rectangular shape, or a rounded rectangular shape, of waveguide channels may be highly convenient to manufacture, though other methods known or not yet known may be implemented to manufacture waveguide channels with equal or even greater convenience.

In some examples, an antenna configuration may include a plurality of waveguide antenna elements arranged in a first array configured to operate with a first polarization and a plurality of waveguide output ports arranged in a second array configured to operate with a second polarization. Particularly, the second polarization may differ from the first polarization (e.g., orthogonal to each other). The antenna configuration may also include a polarization-modification layer with channels defined therein such that the polarization-modification layer is disposed between the waveguide antenna elements and the waveguide output ports. As such, the channels may be oriented at a first angle with respect to the waveguide antenna elements and at a second angle with respect to the waveguide output ports. For instance, the first angle may be between 44 and 46 degrees and the second angle may be between 44 and 46 degrees. In addition, the channels may be configured to receive input electromagnetic waves having the first polarization and transmit output electromagnetic waves having a first intermediate polarization. Similarly, the waveguide output ports may be configured to receive input electromagnetic waves and radiate electromagnetic waves having the second polarization.

In further examples, the waveguide antenna elements and the waveguide output ports may be substantially rectangular in shape. In other examples, the waveguide antenna elements and the waveguide output ports may be substantially circular in shape. Further, the channels may be shaped as round rectangles and the channels may be filled with a dielectric material. In some instances, the thickness of the polarization-modification layer may vary. For example, the thickness of the polarization-modification layer may be between a half and a whole wavelength of the input electromagnetic waves having the first polarization.

In addition, some examples may also involve a secondary polarization-modification layer with secondary channels defined therein. Particularly, the secondary polarization-modification layer may be disposed between the polarization-modification layer and the waveguide output ports and the secondary channels may be oriented at a third angle with respect to the waveguide antenna elements and at a fourth angle with respect to the waveguide output ports. Further, the secondary channels may be configured to receive input electromagnetic waves having the first intermediate polarization and transmit output electromagnetic waves having a second intermediate polarization. As such, the first intermediate polarization may differ from the second intermediate polarization. As an example, a bandwidth of usable frequencies associated with the radar antenna may lie within the 77 GHz band. In some instances, the first angle may be between 25 and 35 degrees, the second angle may be between 50 and 70 degrees, the third angle may be between 50 and 70 degrees, and the fourth angle may be between 25 and 35 degrees. Other degrees for the angles are possible.

Further, it should be understood that other layouts, arrangements, amounts, or sizes of the various elements illustrated in the figures are possible, as well. For example, it should be understood that a given application of an antenna or antenna system may determine appropriate dimensions and sizes for various machined portions of the polarization-modification unit cells illustrated in the figures (e.g., channel size, metal layer thickness, etc.) and/or for other machined (or non-machined) portions/components of the antenna(s) and antenna system(s) described herein. For instance, as discussed above, some example radar systems may be configured to operate at an electromagnetic wave frequency of 77 GHz, which corresponds to millimeter electromagnetic wave length. At this frequency, the channels, ports, etc. of an apparatus may be of given dimensions appropriated for the 77 GHz frequency. Other example antennas and antenna applications are possible as well.

Still further, the word "antenna" should not be limited to applications involving electromagnetic waves solely within radio frequencies of the electromagnetic spectrum. The term "antenna" is used herein broadly to describe a device that is capable of transmitting and/or receiving any electromagnetic wave. For example, any of the antennas or components of the antennas described herein could be capable of transmitting and/or receiving optical light. Even further, any of the antennas or components of the antennas described herein could be capable of being fed by optical sources (e.g., optical fibers or optical lasers). Such example antennas could be used as optical interconnects within a computing devices, for instance. In addition, corresponding shapes and dimensions of components within such antennas may vary depending on the wavelength (e.g., components used in optical embodiments may have feature sizes on the scale of hundreds of nanometers as opposed to millimeter feature sizes in radio embodiments). In addition, radar units may operate as a part of a vehicle radar system. As such, a radar unit may be positioned on a vehicle component, built into a vehicle component, or a combination in some examples.

It should be understood that arrangements described herein are for purposes of example only. As such, those skilled in the art will appreciate that other arrangements and other elements (e.g., machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. An antenna, comprising:
a plurality of waveguide antenna elements arranged in a first array configured to operate with a first polarization;
a plurality of waveguide output ports arranged in a second array configured to operate with a second polarization, wherein the second polarization is different from the first polarization;
a polarization-modification layer with channels defined therein; and
a rotation component coupled to the polarization-modification layer,
wherein the polarization-modification layer is disposed between the waveguide antenna elements and the waveguide output ports,
wherein the channels are oriented at a first angle with respect to the waveguide antenna elements and at a second angle with respect to the waveguide output ports,
wherein the channels are configured to receive input electromagnetic waves having the first polarization and transmit output electromagnetic waves having a first intermediate polarization,
wherein the waveguide output ports are configured to receive input electromagnetic waves and radiate electromagnetic waves having the second polarization, and
wherein the rotation component is configured to adjust a position of the polarization-modification layer relative to the waveguide antenna elements and the waveguide output ports.

2. The antenna of claim 1, wherein the waveguide antenna elements and the waveguide output ports are substantially rectangular in shape.

3. The antenna of claim 1, wherein the waveguide antenna elements and the waveguide output ports are substantially circular in shape.

4. The antenna of claim 1, wherein the channels are shaped as rounded rectangles.

5. The antenna of claim 1, wherein the first polarization is orthogonal to the second polarization.

6. The antenna of claim 1, wherein the first angle is between 44 and 46 degrees and wherein the second angle is between 44 and 46 degrees.

7. The antenna of claim 1, wherein a thickness of the polarization-modification layer is between a half and a whole wavelength of the input electromagnetic waves having the first polarization.

8. The antenna of claim 1, wherein the channels are filled with a dielectric material.

9. The antenna of claim 1, further comprising a secondary polarization-modification layer with secondary channels defined therein,
   wherein the secondary polarization-modification layer is disposed between the polarization-modification layer and the waveguide output ports,
   wherein the secondary channels are oriented at a third angle with respect to the waveguide antenna elements and at a fourth angle with respect to the waveguide output ports,
   wherein the secondary channels are configured to receive input electromagnetic waves having the first intermediate polarization and transmit output electromagnetic waves having a second intermediate polarization, and
   wherein the first intermediate polarization is different from the second intermediate polarization.

10. The antenna of claim 9, wherein a bandwidth of usable frequencies associated with the radar antenna lies within the 77 GHz band.

11. The antenna of claim 9, wherein the first angle is between 25 and 35 degrees, wherein the second angle is between 50 and 70 degrees, wherein the third angle is between 50 and 70 degrees, and wherein the fourth angle is between 25 and 35 degrees.

12. A radar system, comprising:
   a transmitter, comprising:
      a plurality of first waveguide antenna elements arranged in a first array configured to operate with a first polarization;
      a first polarization-modification layer with first channels defined therein; and
      a first rotation component coupled to the first polarization-modification layer,
      wherein the first polarization-modification layer is disposed adjacent to the first waveguide antenna elements,
      wherein the first channels are oriented at a first angle with respect to the first waveguide antenna elements,
      wherein the first channels are configured to receive input electromagnetic waves having the first polarization and transmit output electromagnetic waves having a second polarization, and
      wherein the first rotation component is configured to adjust a position of the first polarization-modification layer relative to the first waveguide antenna elements; and
   a receiver, comprising:
      a plurality of second waveguide antenna elements arranged in a second array configured to operate with the first polarization;
      a second polarization-modification layer with second channels defined therein,
      wherein the second polarization-modification layer is disposed adjacent to the second waveguide antenna elements,
      wherein the second channels are oriented at the first angle with respect to the second waveguide antenna elements, and
      wherein the second channels are configured to receive input electromagnetic waves having the second polarization and transmit output electromagnetic waves having the first polarization to the second waveguide antenna elements.

13. The radar system of claim 12, wherein the transmitter further comprises:
   a third polarization-modification layer with third channels defined therein,
   wherein the third polarization-modification layer is disposed adjacent to the first polarization-modification layer,
   wherein the third channels are oriented at a second angle with respect to the first channels, and
   wherein the third channels are configured to receive input electromagnetic waves having the second polarization and transmit output electromagnetic waves having a third polarization; and
wherein the receiver further comprises:
   a fourth polarization-modification layer with fourth channels defined therein,
   wherein the fourth polarization-modification layer is disposed adjacent to the second polarization-modification layer,
   wherein the fourth channels are oriented at the second angle with respect to the second channels, and
   wherein the fourth channels are configured to receive input electromagnetic waves having the third polarization and transmit output electromagnetic waves having the second polarization to the second channels.

14. The radar system of claim 13, wherein the first angle is between 20 and 25 degrees, and wherein the second angle is between 20 and 25 degrees.

15. The radar system of claim 12, wherein the radar system further comprises:
   a vehicle, wherein the transmitter of the radar system is coupled to a portion of the vehicle.

16. The radar system of claim 12, wherein the first channels and the second channels are shaped as rounded rectangles.

17. The radar system of claim 12, wherein the first angle is between 44 and 46 degrees.

18. The radar system of claim 12, wherein a thickness of the first polarization-modification layer is less than a wavelength of the input electromagnetic waves having the first polarization.

19. The radar system of claim 12, wherein the first channels and the second channels are filled with a dielectric material.

20. A method, comprising:
   emitting electromagnetic waves having a first polarization from a plurality of waveguide antenna elements arranged in a first array;
   receiving, by channels defined within a polarization-modification layer that is disposed between the waveguide antenna elements and a plurality of waveguide output ports arranged in a second array, the electromagnetic waves having the first polarization, wherein the channels are oriented at a first angle with respect to the waveguide antenna elements;
   transmitting, by the channels defined within the polarization-modification layer, electromagnetic waves having an intermediate polarization;
   receiving, by the waveguide output ports, electromagnetic waves having the intermediate polarization, wherein the waveguide output ports are oriented at a second angle with respect to the channels;
   radiating, by the waveguide output ports, electromagnetic waves having a second polarization, wherein the second polarization is different from the first polarization, wherein the second polarization is different from the intermediate polarization, and wherein the first polarization is different from the intermediate polarization; and adjusting, by a rotation component coupled to the polarization-modification layer, a position of the polarization-modification layer relative to the waveguide antenna elements and the plurality of waveguide output ports.

* * * * *